(12) United States Patent
Wei et al.

(10) Patent No.: US 11,375,521 B2
(45) Date of Patent: Jun. 28, 2022

(54) COMMUNICATION RESOURCE SCHEDULING METHOD, APPARATUS, AND SYSTEM

(71) Applicant: Huawei Cloud Computing Technologies Co., Ltd., Guizhou (CN)

(72) Inventors: Haitao Wei, Shenzhen (CN); Yuan Li, Xi'an (CN)

(73) Assignee: Huawei Cloud Computing Technologies Co., Ltd., Guizhou (CN)

( * ) Notice: Subject to any disclaimer, the term of this patent is extended or adjusted under 35 U.S.C. 154(b) by 47 days.

(21) Appl. No.: 16/718,705

(22) Filed: Dec. 18, 2019

(65) Prior Publication Data
US 2020/0128566 A1 Apr. 23, 2020

Related U.S. Application Data

(63) Continuation of application No. PCT/CN2018/092972, filed on Jun. 27, 2018.

(30) Foreign Application Priority Data

Jun. 27, 2017 (CN) .......................... 201710501029.1

(51) Int. Cl.
*H04W 72/12* (2009.01)
*H04L 67/125* (2022.01)
(Continued)

(52) U.S. Cl.
CPC ....... *H04W 72/1231* (2013.01); *H04L 67/125* (2013.01); *H04W 72/0413* (2013.01);
(Continued)

(58) Field of Classification Search
CPC ......... H04W 72/1231; H04W 72/0413; H04W 72/0446; H04W 72/1284; H04W 4/40;
(Continued)

(56) References Cited

U.S. PATENT DOCUMENTS

2004/0022209 A1* 2/2004 Misra .................... H04W 76/18
370/328
2009/0075669 A1* 3/2009 Franceschini ......... H04W 76/12
455/452.2
(Continued)

FOREIGN PATENT DOCUMENTS

CN 102523606 A 6/2012
CN 102932924 A 2/2013
(Continued)

OTHER PUBLICATIONS

"3rd Generation Partnership Project; Technical Specification Group Services and System Aspects; Service requirements for V2X services; Stage 1(Release 14)," 3GPP TS 22.185, V14.3.0, Mar. 2017, 14 pages.
(Continued)

*Primary Examiner* — Tejis Daya
(74) *Attorney, Agent, or Firm* — Conley Rose, P.C.

(57) ABSTRACT

When an Internet of things application server determines, based on a service requirement and a service scenario, to start coordinated radio resource scheduling on a terminal, the Internet of things application server sends a coordinated radio resource scheduling activation request to a radio transceiver node, to request the radio transceiver node to perform coordinated radio resource scheduling on the terminal based on a requirement of the Internet of things application server, and after receiving the request, the radio transceiver node allocates a radio resource to the terminal at a higher priority or higher efficiency. If the terminal does not need to apply for the radio resource, the radio transceiver node actively allocates the radio resource to the terminal in order to reduce a radio communication latency of the terminal and implement a low-latency communication requirement in a specific service scenario.

13 Claims, 22 Drawing Sheets

(51) Int. Cl.
*H04W 72/04* (2009.01)
*H04W 4/40* (2018.01)

(52) U.S. Cl.
CPC ... *H04W 72/0446* (2013.01); *H04W 72/1284* (2013.01); *H04W 4/40* (2018.02)

(58) Field of Classification Search
CPC ............. H04W 72/1236; H04W 28/16; H04W 72/1242; H04W 72/121; H04W 72/1215; H04W 72/1273; H04L 67/125; H04L 67/12
See application file for complete search history.

(56) References Cited

U.S. PATENT DOCUMENTS

| | | | | |
|---|---|---|---|---|
| 2009/0092103 | A1* | 4/2009 | Rao | H04L 1/0027 370/336 |
| 2011/0076991 | A1* | 3/2011 | Mueck | H04L 1/0032 455/414.1 |
| 2013/0155966 | A1* | 6/2013 | Bekiares | H04W 72/08 370/329 |
| 2013/0165134 | A1* | 6/2013 | Touag | H04W 72/0486 455/452.1 |
| 2014/0325301 | A1 | 10/2014 | Gao et al. | |
| 2015/0009988 | A1 | 1/2015 | Lim et al. | |
| 2016/0100393 | A1* | 4/2016 | Takashima | H04W 72/048 370/329 |
| 2016/0135016 | A1* | 5/2016 | Zou | H04M 15/66 370/312 |
| 2016/0295624 | A1* | 10/2016 | Novlan | H04W 72/04 |
| 2017/0288886 | A1* | 10/2017 | Atari | H04L 65/1063 |
| 2018/0049224 | A1* | 2/2018 | Dinan | H04W 72/1242 |
| 2018/0295628 | A1* | 10/2018 | Lu | H04W 4/40 |
| 2018/0308353 | A1 | 10/2018 | He et al. | |
| 2019/0029029 | A1* | 1/2019 | Ohtsuji | H04L 5/00 |
| 2019/0058981 | A1* | 2/2019 | Xu | H04W 4/06 |

FOREIGN PATENT DOCUMENTS

| | | |
|---|---|---|
| CN | 105165082 A | 12/2015 |
| CN | 105357758 A | 2/2016 |
| CN | 106211332 A | 12/2016 |
| EP | 2731392 A1 | 5/2014 |
| EP | 2731392 B1 | 11/2018 |
| WO | 2012122828 A1 | 9/2012 |
| WO | 2016197806 A1 | 12/2016 |
| WO | 2017028002 A1 | 2/2017 |
| WO | 2017043940 A1 | 3/2017 |
| WO | 2017130592 A1 | 8/2017 |

OTHER PUBLICATIONS

"3rd Generation Partnership Project; Technical Specification Group Services and System Aspects; Architecture enhancements for V2X services (Release 14)," 3GPP TS 23.285, V14.3.0, Jun. 12, 2017, 35 pages.

"3rd Generation Partnership Project; Technical Specification Group Services and System Aspects; Policy and charging control architecture (Release 14)," 3GPP TS 23.203, V14.4.0, Jun. 12, 2017, 257 pages.

"3rd Generation Partnership Project; Technical Specification Group Services and System Aspects; System Architecture for the 5G System; Stage 2 (Release 15)," 3GPP TS 23.501, V1.0.0, Jun. 2017, 146 pages.

"Presentation of TR 23.501: System Architecture for the 5G System (Release 15) to TSG SA for Approval," SP-170384, S2-174079, Cover Sheet for TS 23501 SA WG2, 3GPP TSG SA Meeting #76, West Palm Beach, Florida, USA, Jun. 7-9, 2017, 2 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 14)," 3GPP TS 23.401, V14.4.0, Jun. 12, 2017, 386 pages.

"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 14)," 3GPP TS 29.272, V14.4.0, Jun. 19, 2017, 163 pages.

"On-Board System Requirements for V2V Safety Communications," SAEJ2945-1Y2016, SAE International, Mar. 2016, 127 pages.

Ericsson, "V2x Message Broadcast," XP051083072, R3-160853, 3GPP TSG-RAN WG3 Meeting #91bis, Bangalore, India, Apr. 11-15, 2016, 6 pages.

ZTE, "Uu transport enhancement for V2X," XP051125661, R1-166985, 3GPP TSG RAN WG1 Meeting #86, Gothenburg, Sweden, Aug. 22-26, 2016, 4 pages.

Samsung, "Solution for key issue 4: multicast/broadcast architecture for CIoT," SA WG2 Meeting #116BIS, S2-164894, Aug. 29-Sep. 2, 2016, Sayna, P.R. China, 3 pages.

* cited by examiner

COMMUNICATION RESOURCE SCHEDULING METHOD, APPARATUS, AND SYSTEM

CROSS-REFERENCE TO RELATED APPLICATIONS

This application is a continuation of International Patent Application No. PCT/CN2018/092972 filed on Jun. 27, 2018, which claims priority to Chinese Patent Application No. 201710501029.1 filed on Jun. 27, 2017. The disclosures of the aforementioned applications are hereby incorporated by reference in their entireties.

TECHNICAL FIELD

The present disclosure relates to the field of the Internet of things, and in particular, to a communication resource scheduling method, apparatus, and system in the field of the Internet of things.

BACKGROUND

With development of an Internet of things technology, the Internet of things technology is applied and popularized in a plurality of industries, such as smart home, intelligent transportation, industrial control, and telemedicine. In some Internet of things applications in a specific industry, a communications latency is sensitive due to a feature and application requirement of an application scenario. For example, in a vehicle to everything (V2X) scenario, an Internet of things in which a vehicle communicates with all things, a vehicle may perceive, using a V2X technology, vehicle or pedestrian information outside a current vision range of a driver in order to avoid a potential collision. Driving intention transmission may be further implemented between vehicles, in an embodiment, the vehicle may receive a driving intention of another vehicle and share sensor data such that an emergency measure is taken in advance to avoid occurrence of a danger. For another example, in an industrial Internet of things (IIoT) application, in an extreme or abnormal case, an industrial device needs to send data to an IIoT application server or another industrial device to maintain normal operation of a system. All the foregoing Internet of things application scenarios have a low-latency communication requirement. For example, in a TS 22.185 specification formulated in a 3rd Generation Partnership Project (3GPP), it is definitely proposed that a maximum latency in an emergency case of V2X communication is 20 milliseconds (ms).

However, a current wireless communications technology cannot meet a low-latency communication requirement in an Internet of things application. For example, in a V2X wireless communications technology based on a cellular technology formulated in the 3GPP, a latency between a user equipment (UE) or a vehicle and a packet data network gateway (P-GW) is set to 50 ms, and cannot meet a radio resource scheduling latency requirement of V2X communication of the vehicle in an emergency.

SUMMARY

This application provides a communication resource scheduling method, apparatus, and system in order to meet a low-latency communication requirement in an Internet of things application.

According to a first aspect, this application provides a communication resource scheduling method, in an embodiment, a method in which an Internet of things application server cooperates with a radio transceiver node to perform radio resource scheduling on a terminal. When the Internet of things application server determines, based on a service requirement and a service scenario, to start coordinated radio resource scheduling on a terminal, the Internet of things application server sends a coordinated radio resource scheduling activation request to the radio transceiver node, where the request carries an identifier of a specified terminal, to request the radio transceiver node to perform coordinated radio resource scheduling on the terminal based on an agreed manner or information carried in a request message, and after receiving the request, the radio transceiver node allocates a radio resource to the terminal at a higher priority or higher efficiency. If the terminal does not need to apply for the radio resource, the radio transceiver node actively allocates the radio resource to the terminal in order to reduce a radio communication latency of the terminal and implement a low-latency communication requirement in a specific service scenario. The communication resource scheduling method is not limited to a specific industry application, and may be widely applied to an Internet of things industry application that is relatively sensitive to a latency such as an industrial Internet of things, a V2X, and telemedicine. In addition, because application scenarios in various industries are different, a latency requirement is different, and a determining rule and an algorithm that require coordinated radio resource scheduling are different, a trigger condition and a determining rule for initiating coordinated radio resource scheduling by the Internet of things application server are not limited in this application.

In a possible embodiment, when the Internet of things application server determines that coordinated radio resource scheduling is no longer specifically required for the terminal, the Internet of things application server sends a coordinated radio resource scheduling deactivation request to the radio transceiver node in order to request the radio transceiver node to stop performing coordinated radio resource scheduling on the terminal in order to avoid unfair or unbalanced radio resource allocation.

A forwarding path of a coordinated radio resource scheduling activation or deactivation message is not limited in this application. The message may be forwarded using an Internet of things control function and any one or more functional entities in a communications network.

In a possible embodiment, to enable the radio transceiver node or the terminal to perceive an Internet of things service related to coordinated radio resource scheduling, the Internet of things application server may further add service flow information between the terminal and the Internet of things server to the coordinated radio resource scheduling activation or deactivation message, and send the radio resource activation or deactivation message that carries the service flow information to a communications network entity that has a bearer control function, such as any one or more functional entities in a policy and charging rules function, a policy control function, a packet data gateway, and a session management function. The bearer control function entity determines a service bearer identifier corresponding to the information about an Internet of things service flow, and adds the service bearer identifier to the coordinated radio resource scheduling activation or deactivation message forwarded to the radio transceiver node.

In another possible embodiment, to control the coordinated radio resource scheduling initiated by the Internet of things server, such as controlling a frequency or a quantity of times, and to ensure that relatively fair and balanced radio resources are provided for all terminals, if a terminal user needs to ensure low-latency radio communication and improve service experience, the terminal user needs to subscribe the coordinated radio resource scheduling for a specific service or an access point name (APN). Correspondingly, the coordinated radio resource scheduling activation or deactivation message needs to be forwarded by a coordinated radio resource scheduling decision function entity such that the coordinated radio resource scheduling decision function entity forwards the coordinated radio resource scheduling or deactivation message to the radio transceiver node when the coordinated radio resource scheduling decision function entity queries that the coordinated radio resource scheduling is supported in user subscription data.

To enable the radio transceiver node to better perform coordinated radio resource scheduling on the specified terminal, the Internet of things application server may further add, to the coordinated radio resource scheduling activation request, one or more pieces of information of a coordinated radio resource scheduling latency requirement, a coordinated radio resource scheduling uplink packet size, and a coordinated radio resource scheduling uplink packet period or uplink packet moment. The radio transceiver node may adjust a scheduling priority of each terminal based on the coordinated radio resource scheduling latency requirement, may allocate, to the specified terminal based on the coordinated radio resource scheduling uplink packet size, a radio resource that meets a service requirement in order to avoid a waste of the radio resource, and may allocate, based on the coordinated radio resource scheduling uplink packet period or uplink packet moment, the radio resource to the terminal at a moment at which the terminal needs to report data. This improves radio resource utilization efficiency.

In a possible embodiment, the radio transceiver node may further forward the coordinated radio resource scheduling activation or deactivation request to the terminal in order to improve communication efficiency. The terminal may preferentially send data of an Internet of things service based on an identifier of the Internet of things service in the coordinated radio resource scheduling activation or deactivation request. The terminal may adjust, based on the coordinated radio resource scheduling uplink packet size, a size of an Internet of things service packet that needs to be sent an uplink packet size in order to avoid a communication efficiency and communication latency problem that are brought when a radio resource allocated by the radio transceiver node does not match a size of an uplink packet to be sent by the terminal, for example, a radio resource waste problem caused when the radio resource allocated by the radio transceiver node is greater than the size of the uplink packet to be sent by the terminal, and for another example, a transmission efficiency decrease problem caused by that the radio resource needs to be allocated for a plurality of times when the radio resource allocated by the radio transceiver node is less than the size of the uplink packet to be sent by the terminal. In addition, that the coordinated radio resource scheduling uplink packet period or uplink packet moment is sent to the terminal may adjust a speed of allocating and using a radio resource by the radio transceiver node and the terminal. This improves radio resource utilization and communication efficiency.

According to a second aspect, this application provides an apparatus, to implement a function of an Internet of things application server, a function of a radio transceiver node, or a function of a terminal in the method according to the first aspect. The function of the Internet of things application server, the function of the radio transceiver node, or the function of the terminal may be implemented by hardware, or may be implemented by hardware by executing corresponding software. The hardware or the software includes one or more modules corresponding to the function.

According to a third aspect, this application provides an apparatus, to implement an Internet of things control function, a bearer control function, or a coordinated radio resource scheduling decision function in the method according to the first aspect. These functions may be implemented by hardware, or may be implemented by hardware executing corresponding software. The hardware or the software includes one or more modules corresponding to the function.

According to a fourth aspect, this application provides a computer-readable storage medium. The computer-readable storage medium stores an instruction. When the instruction runs on a computer, the computer is enabled to perform the method according to the first aspect.

According to a fifth aspect, this application provides a computer program product that includes an instruction. When the computer program product runs on a computer, the computer is enabled to perform the method according to the aspect.

According to a sixth aspect, this application provides a system for implementing communication resource scheduling, where the system includes at least the Internet of things application server and the radio transceiver node as described above. In addition, the system may further include one or more of a terminal, an Internet of things control function, a bearer control function, and a coordinated radio resource scheduling decision function.

DESCRIPTION OF EMBODIMENTS

The following describes the technical solutions in the embodiments of the present disclosure with reference to the accompanying drawings in the embodiments of the present disclosure.

Figure 1A:
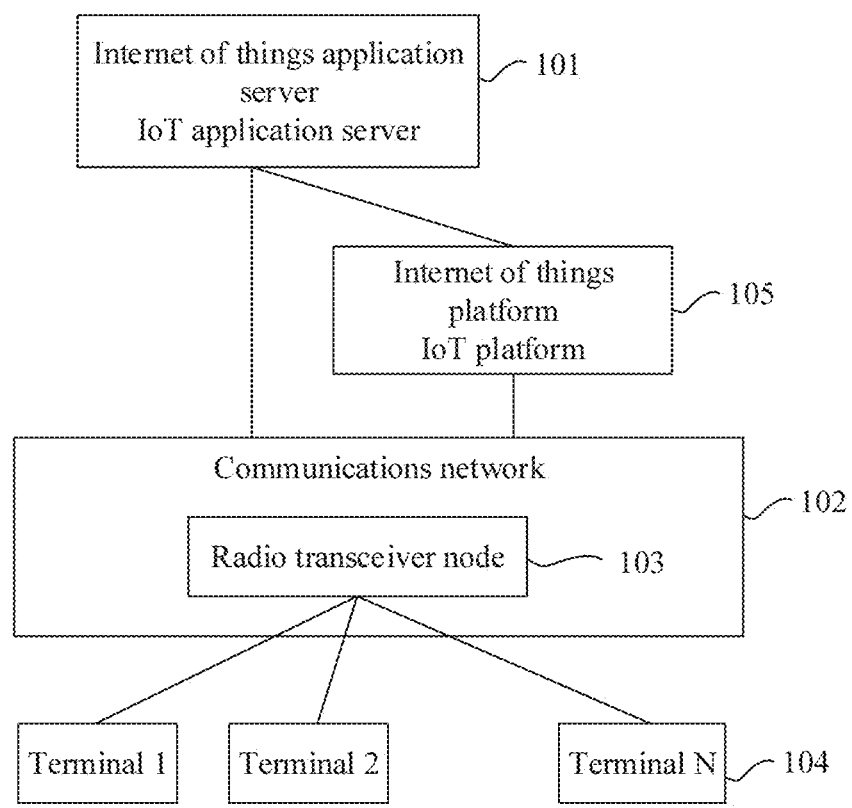
FIG. 1A is a schematic diagram of a system architecture according to an embodiment of the present disclosure.

The technical solution provided in this application is based on an Internet of things system architecture shown in FIG. 1A. The Internet of things system shown in FIG. 1A includes at least an Internet of things application server (IoT AS) 101, a communications network 102, and an Internet of things terminal 104. The communications network 102 includes at least a radio transceiver node 103. The Internet of things application server 101 communicates with the terminal 104 using wireless and wired communication resources provided by the communications network 104, for example, receiving data reported by the terminal 104, sending a control command to the terminal 104, and the like. Optionally, the Internet of things system further includes an Internet of things platform 105. The Internet of things platform 105 includes at least a connection and management function of the Internet of things terminal 104. The Internet of things platform 105 may also be referred to as an Internet of things connection management function. The Internet of things platform 105 communicates with the terminal 104 using the communications network 102. For example, the Internet of things platform 105 may send the received data reported by the terminal to the IoT AS 101, or may send the received control command sent by the IoT AS 101 to the terminal 104 using the communications network 102. Two or more terminals may also communicate with each other using a communications network. For example, two terminals exchange a message using a radio transceiver node, and the message exchanged between the two terminals does not need to be forwarded using an Internet of things application server. It should be noted that in the Internet of things architecture, the terminal 104 may also be considered as UE having a communication function. Therefore, the terminal may also be referred to as UE.

Figure 1B:
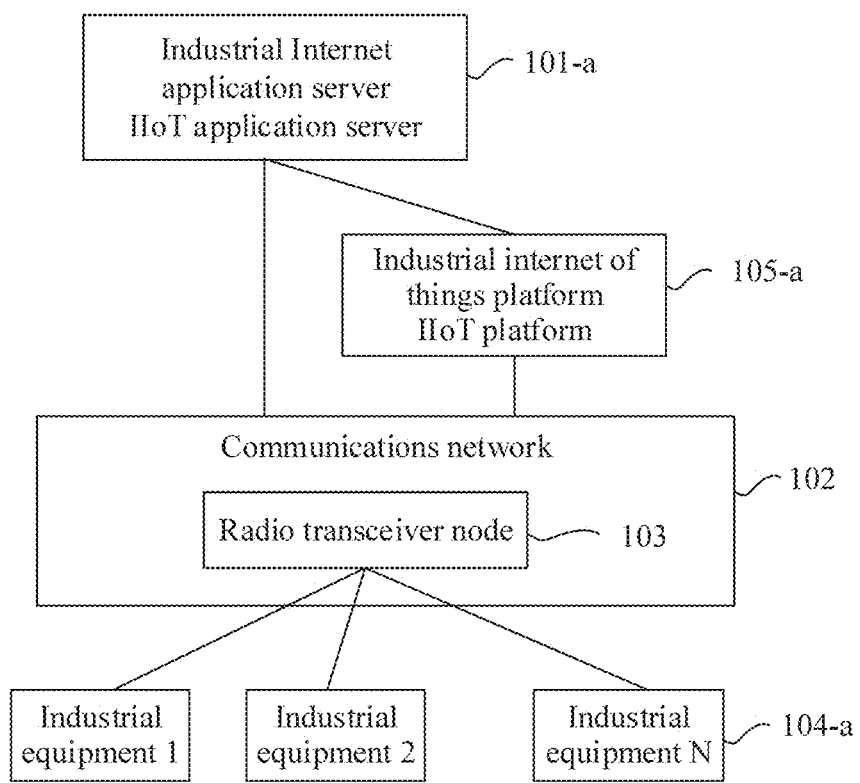
FIG. 1B is a schematic diagram of another system architecture according to an embodiment of the present disclosure.
Figure 1C:
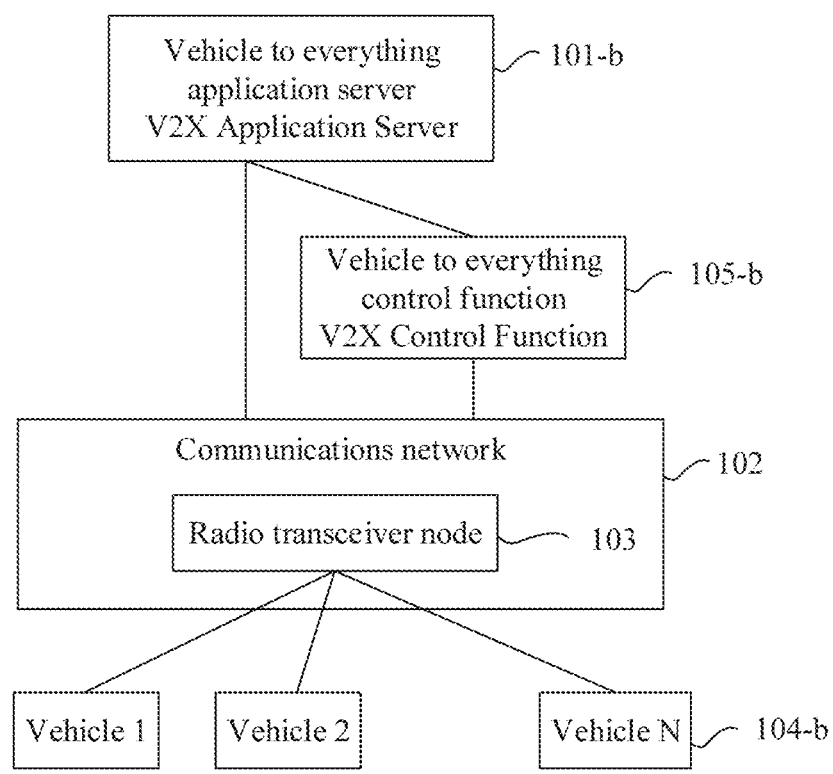
FIG. 1C is a schematic diagram of still another system architecture according to an embodiment of the present disclosure.

The technical solution provided in this application and the system architecture shown in FIG. 1A may be applicable to a plurality of industry applications, such as intelligent transportation and an industrial Internet. FIG. 1B and FIG. 1C are respectively system architectural diagrams in which the technical solution provided in this application is applied to an industrial Internet and a V2X. An industrial Internet application server 101-*a* and a V2X application server (V2X AS) 101-*b* are possible forms of the Internet of things application server 101 in FIG. 1A in different application scenarios. An industrial Internet platform 105-*a* and a V2X control function (VCF) 105-*b* are possible forms of the Internet of things platform 105 in FIG. 1A in different application scenarios. An industrial device 104-*a* and a vehicle 104-*b* are possible forms of the terminal 104 in FIG. 1A in different application scenarios. To make it easier for a person skilled in the art to understand the technical solution provided in this application, the following embodiments of this application use an application scenario in the V2X as an example to describe the technical solution provided in this application. It may be understood that the technical solution provided in this application does not limit a specific industry application. Although names or forms of Internet of things application servers and terminals are different in different industry applications, Internet of things systems based on the Internet of things architecture shown in FIG. 1A may use the technical solution described in the embodiments of this application to implement communication resource scheduling on terminals.

The following further describes the technical solution provided in this application using an example in which the V2X is applied to a specific scenario.

In the V2X system shown in FIG. 1C, the V2X AS 101-*b* communicates with the vehicle 104-*b* using wireless and wired communication resources provided by the communications network 104, for example, receiving information such as vehicle driving environment data, driving behavior data, and vehicle running data that are reported by the vehicle, and sending driving assistance information, warning information, and the like to the vehicle 104-*b*. The vehicle 104-*b* includes a sensor device and a vehicle communications unit. The sensor device may collect information such as a speed, a position, a driving environment, and a behavior of the vehicle, and the vehicle may receive and send data using the vehicle communications unit.

Figure 2:
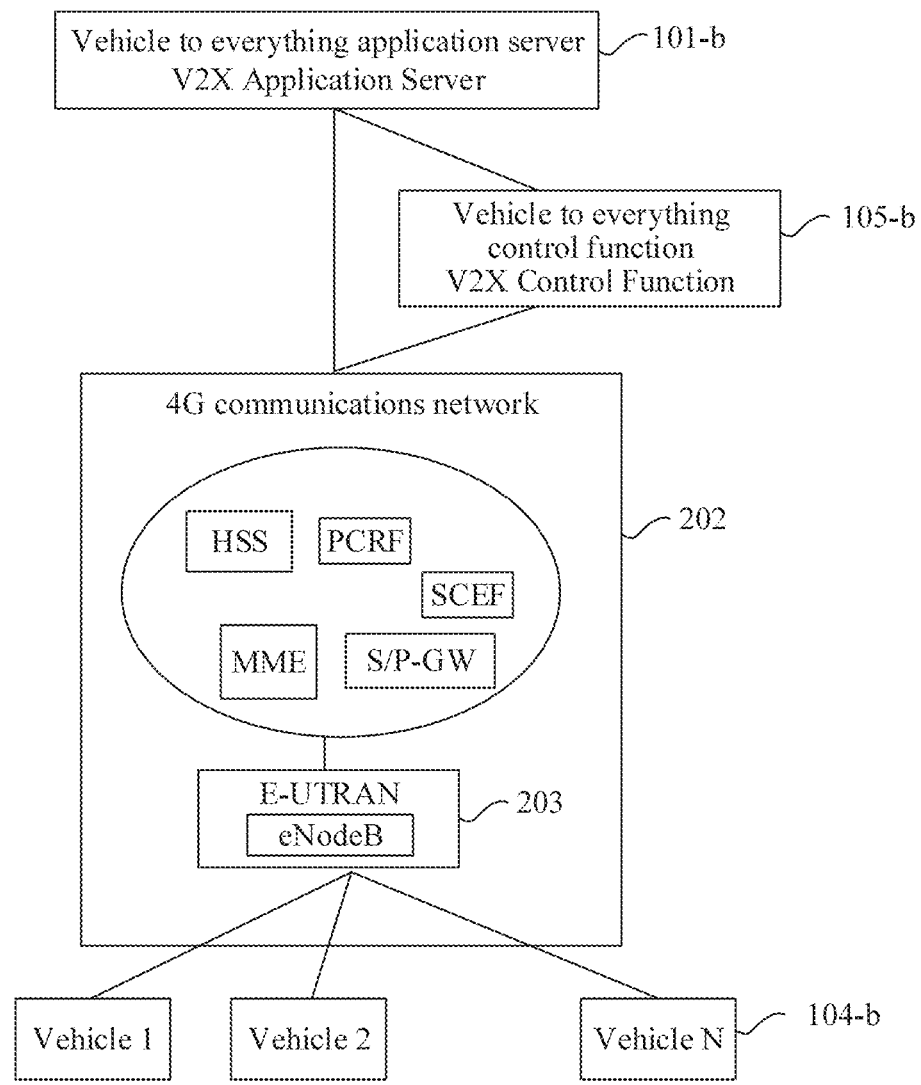
FIG. 2 is a schematic diagram of a system architecture in a fourth generation (4G) communications network according to an embodiment of the present disclosure.
Figure 3:
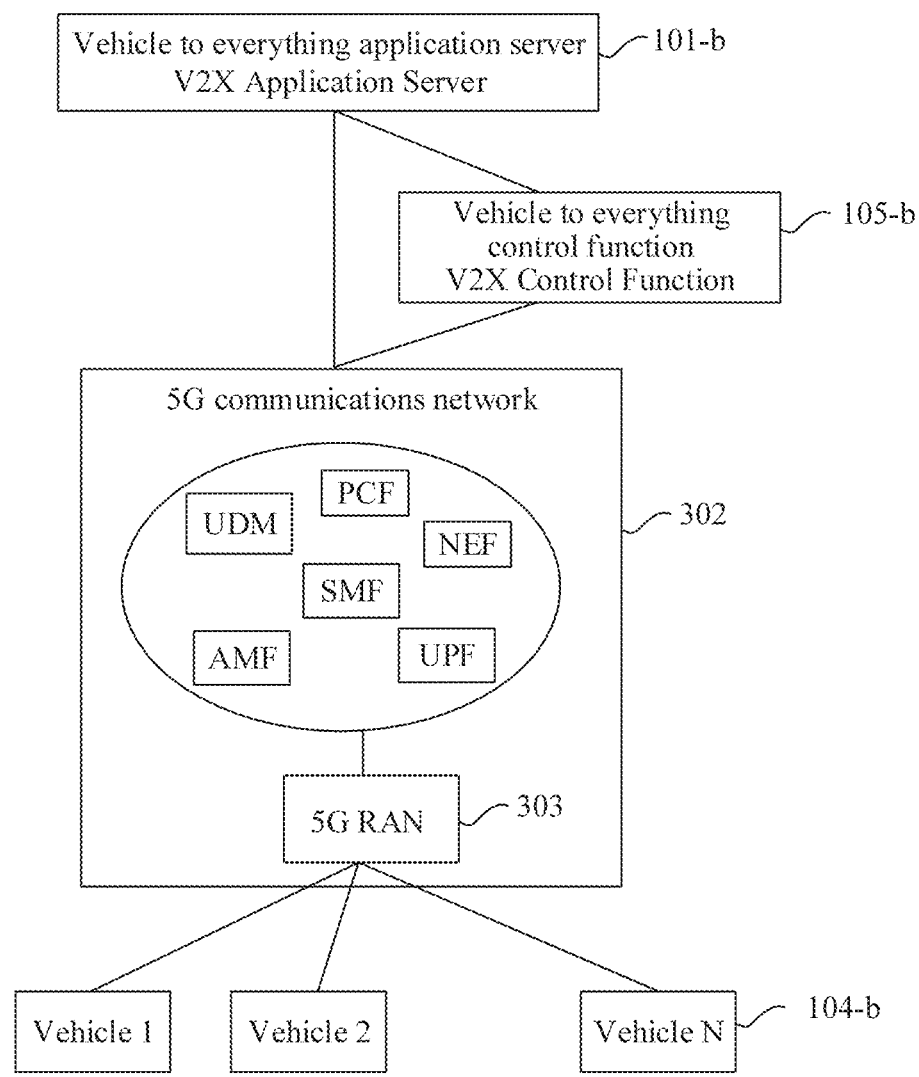
FIG. 3 is a schematic diagram of a system architecture in a fifth generation (5G) communications network according to an embodiment of the present disclosure.

Based on the system architecture shown in FIG. 1C, FIG. 2 and FIG. 3 further provide two different types of communications networks to implement the system architecture in the embodiment of the present disclosure. A person skilled in the art may understand that a type of a communications network is not limited in this application.

FIG. 2 is a V2X system architecture based on a 4G communications network defined by a 3GPP standard organization according to this application. The communications network 102 in FIG. 1A to FIG. 1C is instantiated as a 4G communications network 202 in FIG. 2, including a device, entity, or a network, such as a home subscriber server (HSS), a policy and charging rules function (PCRF), a mobility management entity (MME), a session/packet data network gateway (S/P-GW), an evolved universal terrestrial radio access network (E-UTRAN), a service capability exposure function (SCEF), where the E-UTRAN 203 includes an evolved NodeB (eNodeB), and the eNodeB is an embodiment of the radio transceiver node 103 in FIG. 1A to FIG. 1C.

FIG. 3 is a V2X system architecture based on a 5G communications network defined by a 3GPP standard organization according to this application. The communications network 102 in FIG. 1A to FIG. 1C is instantiated as a 5G communications network 302 in FIG. 3, including a logic function, a device, an entity, or a network, such as a policy control function (PCF), a session management function (SMF), an access and mobility function (AMF), a user plane function (UPF), a user data management (UDM), a radio access network (RAN), and a network exposure function (NET). The RAN-303 includes a radio transceiver node supporting a 5G access.

It can be learned from the architecture of the V2X system shown in FIG. 1C to FIG. 3 that communication between the vehicle and the V2X AS or between vehicles is performed using a communications network. Regardless of a type and an architecture of the communications network, regardless of how a message or data of a V2X application is forwarded in the communications network, when a message sent by any vehicle needs to be delivered to another vehicle or the V2X AS, communication between the vehicle and the radio transceiver node is an essential communication path. Therefore, as long as a communication latency between the vehicle and the radio transceiver node is reduced, a communication latency between the vehicle and the V2X AS or between vehicles can be reduced in order to meet a latency requirement of a V2X service in an emergency situation. It should be noted that the term "emergency" in this application generally refers to a scenario in which a low latency or fast response is required in a specific industry application, and a specific technical requirement for a latency in an emergency degree, such as 30 ms or 20 ms or 10 ms or 5 ms, depends on a specific service scenario and a communications network capability. This is not limited in this application.

Figure 4:
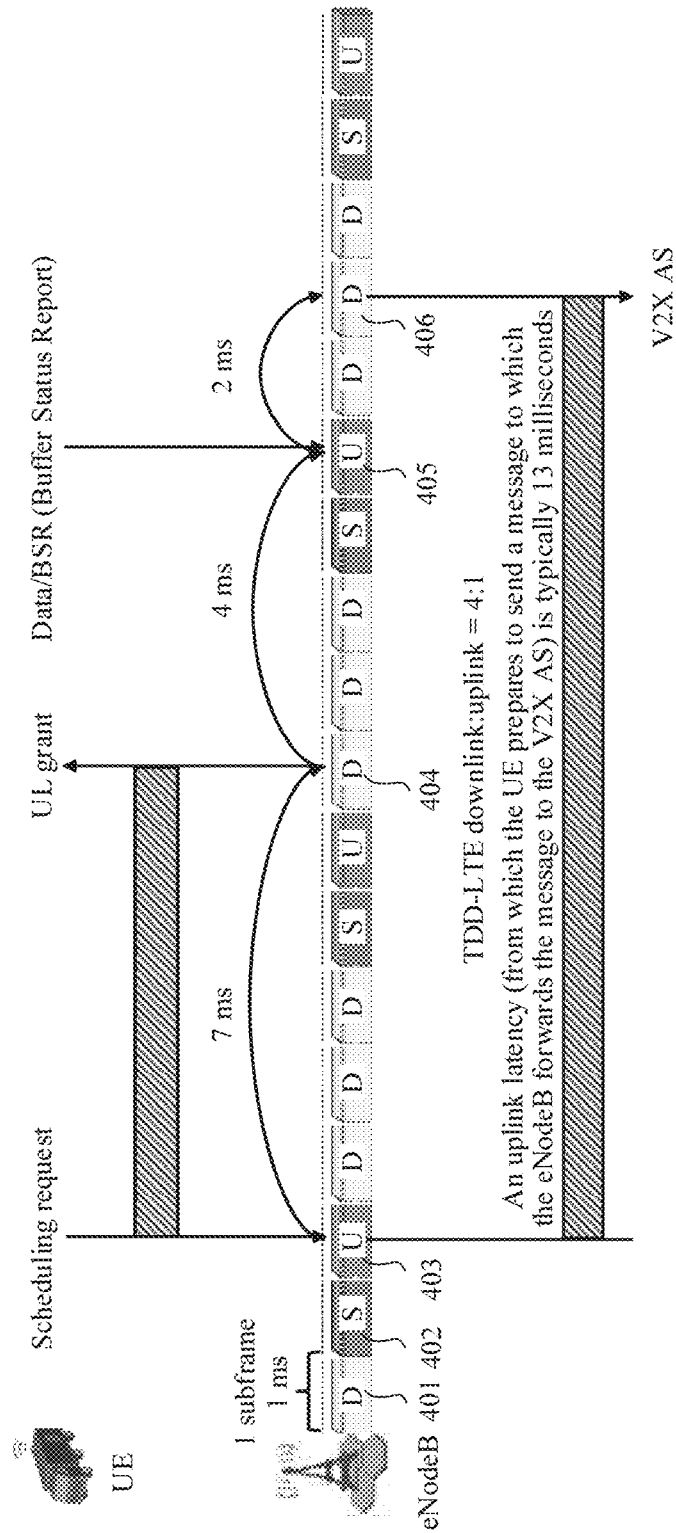
FIG. 4 is a schematic diagram of radio resource scheduling according to an embodiment of the present disclosure.

In the other approaches, to report data to a V2X AS or send data to another vehicle using a communications network, the vehicle first needs to request an air interface resource to the radio transceiver node using an uplink channel, and then the radio transceiver node delivers, to the vehicle using a downlink channel, the air interface resource that is granted to be used by the vehicle such that the vehicle can send data using the granted air interface resource. If a data volume to be reported by the vehicle is relatively large, the radio transceiver node needs to allocate the air interface resource to the vehicle for a plurality of times. In FIG. 4, a 4G time division duplex long term evolution (TDD-LTE) technology is used as an example to analyze a communication latency between a vehicle and a radio transceiver node in the other approaches.

In FIG. 4, a time axis on an eNodeB side is broken down into a plurality of subframes, and a time length of each subframe is 1 ms. There are three types of subframes D, S, and U, where a D-type subframe, as shown in 401, represents a downlink subframe, and the eNodeB may send a downlink message to the UE within a time period of the downlink subframe. A U-type subframe, as shown in 403, represents an uplink subframe, and the eNodeB may receive, within a time period of the uplink subframe, an uplink message sent by the UE. An S-type subframe, as shown in 402, represents a special subframe, and is used to implement switching or inversion between a downlink and an uplink. In addition, the eNodeB may also be configured to transmit downlink data, and the special subframe may also be considered as a downlink subframe.

As shown in FIG. 4, it is assumed that a vehicle encounters an emergency, such as an emergency brake or out of control, and the vehicle reports a scheduling request message to the eNodeB in the uplink subframe 403, to request the eNodeB to allocate an uplink air interface resource to the vehicle in order to report data to the eNodeB. After internal resource planning or allocation, the eNodeB sends an uplink (UL) grant message to the vehicle in a 404 downlink subframe in order to indicate an uplink air interface resource allocated to the vehicle or granted to be used by the vehicle, and it takes 7 ms from requesting the air interface resource in 403 to the air interface resource that is granted in 404. After receiving the uplink air interface resource that is granted to be used by the vehicle, the vehicle cannot immediately report data, and needs to wait for 4 milliseconds to report the data in an uplink subframe 405. Then, after being processed for 2 ms, the received vehicle-reported data is sent by the eNodeB to the V2X AS at a moment at which a downlink subframe 406 is located.

It should be noted that the vehicle further reports a buffer status report (BSR) in the uplink subframe 405 in order to notify the eNodeB whether the vehicle has data to be sent or reported. If the vehicle has cached data waiting to be reported, the eNodeB further needs to allocate the uplink air interface resource to the vehicle, and send a UL grant message to the vehicle again. It should be further noted that the eNodeB does not need to use the air interface resource to forward data to the V2X AS, and has no binding relationship with the air interface resource, that is, the time subframe. Herein, only a moment at which the downlink subframe 406 is located is used to indicate a moment at which the eNodeB forwards the data to the V2X AS.

Time data shown in FIG. 4 is typical data in an embodiment, and is generally representative. For example, after receiving the scheduling request message in the uplink subframe 403, the eNodeB usually cannot immediately send the UL grant message to the UE in next four downlink subframes in this period, and then needs to wait for a downlink subframe in a next period to send the UL grant message to the UE. It can be learned from the foregoing analysis that the vehicle needs to report the data to the V2X AS. A latency of 13 ms is consumed for transmitting the data to an air interface from the vehicle to the eNodeB only. A latency of 2 ms from which the eNodeB receives the data in 405 to which the eNodeB sends the data in 406 is independent of the air interface, and the remaining 11 ms latency is a latency (4 ms) that is from delivering an air interface resource (UL Grant) to reporting data and that is partly caused by a proportion of an uplink subframe and a downlink subframe of the TDD-LTE technology, and is a latency (7 ms) that is partly caused by internal resource allocation processing after receiving an air interface resource scheduling request by the eNodeB.

Figure 5:
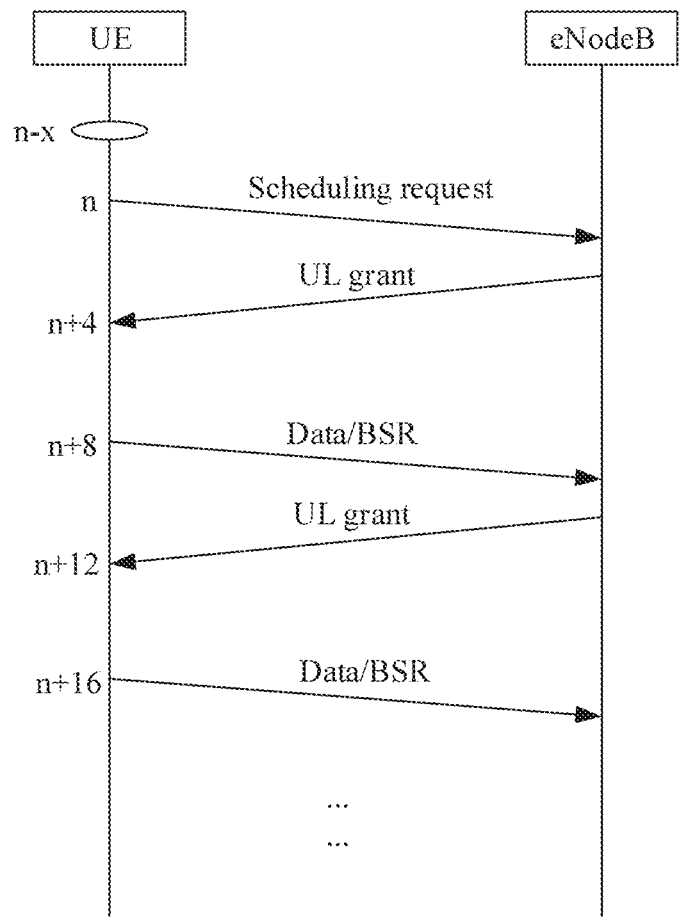
FIG. 5 is a schematic diagram of another radio resource scheduling according to an embodiment of the present disclosure.

FIG. 4 is an analysis of an air interface latency using the TDD-LTE technology as an example. In FIG. 5, an FDD-LTE technology is used as an example to illustrate that in a frequency division duplex long term evolution (FDD-LTE) technology, there is also space for optimizing the air interface latency. As shown in FIG. 5, the UE and the eNodeB communicate using the FDD-LTE technology. Because the FDD-LIE technology is a frequency division technology, a latency analysis cannot be performed on an eNodeB side in a form of time axis as shown in FIG. 4, in FIG. 5, time on a UE side is used as a reference to perform the latency analysis.

Moment n−x (a time unit is ms). The UE generates data that needs to be reported to the V2X AS.

Moment n. The UE requests an air interface resource from the eNodeB to report the data.

Moment n+4. The UE receives the air interface resource that is delivered by the eNodeB and that is granted to be used by the UE.

Moment n+8. The UE reports the data using the air interface resource that is granted to be used by the UE, and reports a remaining to-be-sent data volume using the BSR.

Moment n±13. The UE continues to receive the air interface resource that is delivered by the eNodeB and that is granted to be used by the UE.

Moment n+16. The UE reports remaining data.

It can be learned from the foregoing analysis that, in a case of the FDD-LTE, similar to a case of the TDD-LTE, after generating data that needs to be reported to the V2X AS, the vehicle first needs to apply for the air interface resource to an eNodeB, and waits until the eNodeB allocates the resource to the vehicle, and then the vehicle reports the data. If the eNodeB can perceive that the vehicle is about to enter an emergency state, the vehicle does not need to apply for an air interface resource, and the eNodeB actively allocates the air interface resource to the vehicle, an air interface communication latency may be greatly shortened such that the V2X AS responds to a vehicle burst condition in a shorter time, for example, notifies a peripheral vehicle more quickly or provides an emergency handling guide to an in-vehicle driver more such that not only V2X service experience can be greatly improved, but also security and reliability of the V2X system can be improved in an emergency situation.

As a radio transceiver node, the eNodeB does not analyze the vehicle-reported data or environment data around the vehicle, even if the radio transceiver node analyzes the vehicle-reported data, however, in a running process of the vehicle, a single radio transceiver node can only receive vehicle-related data within a period of time, and cannot perform comprehensive analysis. Therefore, the radio transceiver node cannot perceive a vehicle status. In this application, a data processing and analysis capability of the V2X AS is used, when determining, based on data related to a vehicle or a terminal, that coordinated radio resource scheduling needs to be performed on the vehicle or the terminal, the V2X AS instructs the radio transceiver node to start coordinated radio resource scheduling, and the radio transceiver node immediately allocates the air interface resource to the vehicle, and does not need to be requested by the vehicle, the radio transceiver node actively delivers the UL grant message to the vehicle such that the vehicle can report data as soon as possible. The "coordinated radio resource scheduling" in this application refers to that the Internet of things application server coordinates or instructs the radio transceiver node to perform radio resource scheduling on a specified terminal in a specific mode. A specific mode of radio resource scheduling is different from a radio resource scheduling mode of a radio transceiver node in the other approaches, and may be a pre-agreed mode, or may be a mode determined based on an indication parameter of the Internet of things application server. To be different from radio resource scheduling in the other approaches, in this application, the radio resource scheduling performed by the radio transceiver node according to an indication of the Internet of things application server is referred to as coordinated radio resource scheduling.

This application sets no limitation on a determining condition or a determining rule for performing coordinated radio resource scheduling. A person skilled in the art may apply this solution to a vehicle emergency warning and rescue scenario, or may apply this solution to a differentiated service scenario such as very important person (VIP) user experience improvement. A determining algorithm and input data required by the algorithm that are inside the V2X AS are set by a person skilled in the art in a specific application scenario based on a requirement. The vehicle-related data may include information such as running data reported by the vehicle, vehicle ambient environment information reported by a roadside unit (RSU), or a basic security message (BSM), map data, and signal phase and timing (SPaT) that are obtained from a third-party intelligent transport System (ITS). The V2X AS determines, based on the vehicle-related data, that the vehicle is in an emergency such as high-speed running, abnormal driving (such as drunk driving), and a crossroad, and then delivers a coordinated radio resource scheduling instruction to the eNodeB in order to implement coordinated radio resource scheduling of a V2X service. It should be noted that the V2X AS may instruct, using a specific message, the radios transceiver node to perform coordinated radio resource scheduling for a specific UE, or may instruct the radio transceiver node to perform coordinated radio resource scheduling for a specific UE by extending a coordinated radio resource scheduling indication information element in a message in the other approaches. A specific manner of "indication" is not limited in this application, and may be using an agreed message name or using an agreed information element.

Figure 6:
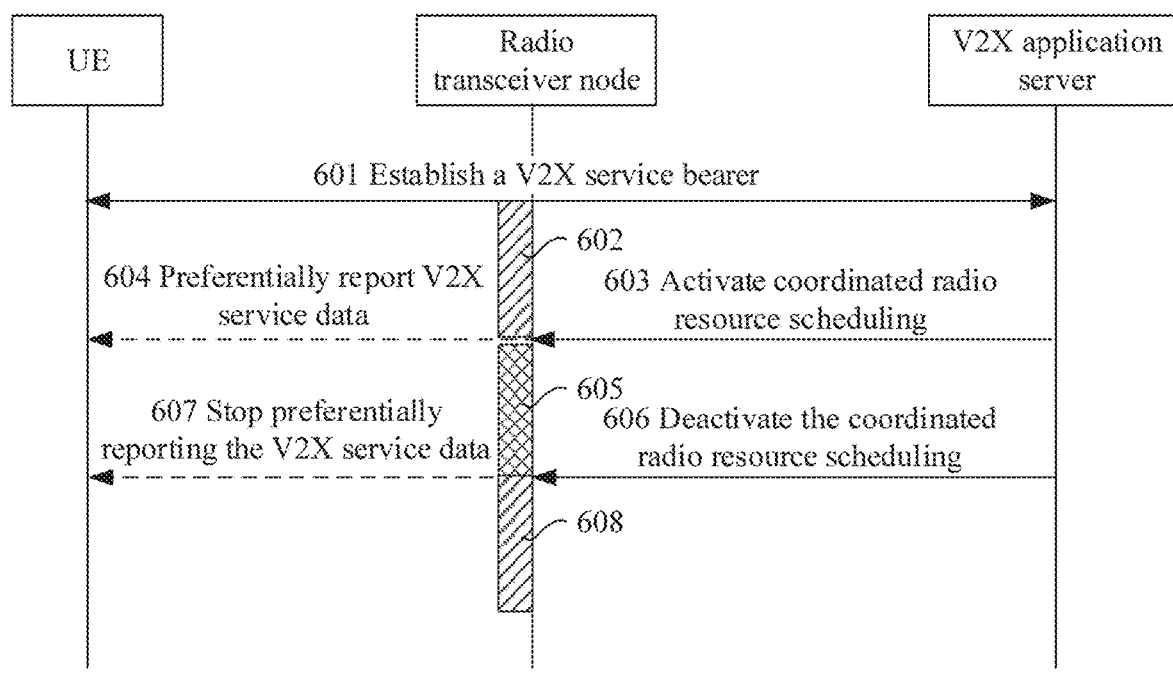
FIG. 6 is a schematic flowchart of a solution conception method of the present disclosure according to an embodiment of the present disclosure.

As shown in FIG. 6, in step 601, a V2X service bearer is established between the UE and the V2X AS, and the V2X service bearer is provided by a communications network, including wireless and wired transmission resources. In a time period 602 before a message 603 is received, the radio transceiver node allocates a radio resource to the UE according to an existing radio resource allocation mechanism, that is, allocates a radio resource to the UE according to FIG. 4, FIG. 5, or another existing radio resource scheduling solution. The V2X AS determines that coordinated air interface resource scheduling needs to be performed on the UE in order to report data of the V2X service of the UE in time. The V2X AS instructs, in the message 603, the radio transceiver node to start or activate coordinated radio resource scheduling on the UE. The radio transceiver node starts coordinated radio resource scheduling on the UE. In a time period 605 before a message 606 is received, the UE does not need to apply for a radio resource, and the radio transceiver node actively allocates the radio resource to the UE. When determining that coordinated air interface resource scheduling does not need to be performed on the UE, the V2X AS sends the message 606 to instruct the radio transceiver node to stop or deactivate coordinated radio resource scheduling on the UE, and the radio transceiver node allocates the radio resource to the UE according to an existing radio resource allocation mechanism in a next time 608. Optionally, if the message 603 carries an identifier of a service, such as the V2X service, when receiving the message 603, the radio transceiver node may further notify the UE of a service related to the coordinated radio resource scheduling such that when the UE has a plurality of services or data connections at the same time, the UE preferentially reports data of a specified service using a radio resource of the coordinated radio resource scheduling. For example, when the UE simultaneously performs a voice service, an Internet access service, and a V2X service, when an emergency occurs on a vehicle, the V2X AS may specify the identifier of the V2X service in the message 603 such that the radio transceiver node may instruct, in the message 604, the UE to preferentially report data of the V2X service. Similarly, after receiving the message 606 indicating that the coordinated radio resource scheduling on the UE is stopped to be performed, if the message 606 carries an Internet of things service identifier (such as an application layer identifier of an Internet of things service) or a bearer identifier of a service, the radio transceiver node may further send a message 607 to the UE, to stop preferentially reporting specified service data. When the UE has a plurality of connections or services and needs to report a plurality of types of service data, how the UE prioritizes the V2X service does not fall within the protection scope of this application. This application also sets no limitation on a data sending queue algorithm or a priority sorting algorithm inside the UE. It should be noted that a message between the V2X AS and the radio transceiver node may further need to be forwarded by another device or network element, such as a gateway or a router. Because these intermediate network elements or devices only forward a message, they are not reflected in the figure.

Figure 7:
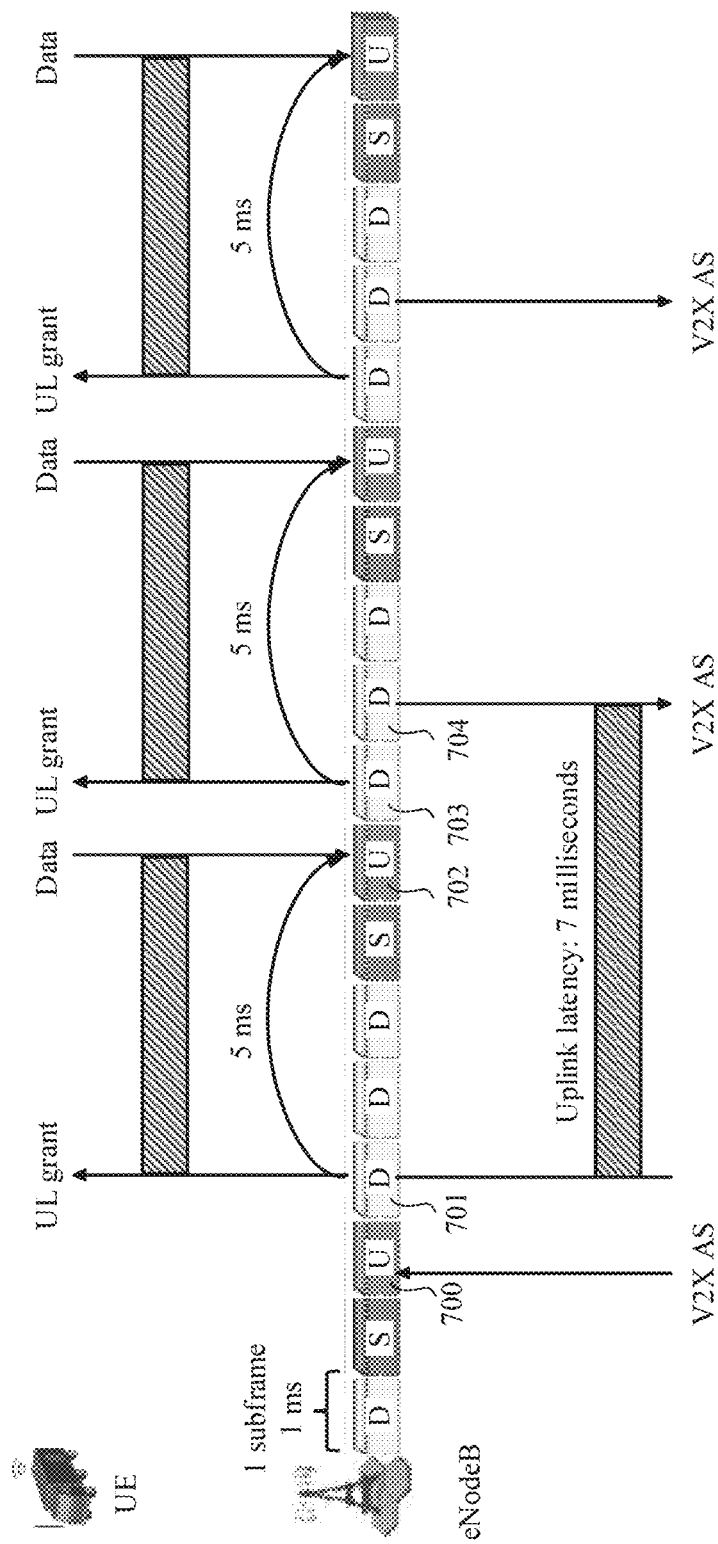
FIG. 7 is a schematic diagram of coordinated radio resource scheduling according to an embodiment of the present disclosure.

As mentioned in FIG. 6, a solution of coordinated radio resource scheduling or coordinated air interface resource scheduling used in a time period 605 is described using a TDD-LTE technology as an example. As shown in FIG. 7, it is assumed that the eNodeB receives, at a moment of a subframe 700, an indication sent by the V2X AS for enabling the coordinated radio resource scheduling for the UE, the eNodeB actively sends a UL grant message to the UE in a downlink subframe 701 to grant a radio resource of the UE, and the UE may report data of a V2X service in a next uplink subframe 702. Next, the eNodeB forwards the data of the V2X service to the V2X AS at a moment in which a subframe 704 is located. In this way, an uplink latency from which the eNodeB grants the radio resource to the UE to which the eNodeB forwards the data to the V2X application server needs only 7 ms, thereby saving waiting time from requesting to granting the radio resource. In addition, after the emergency resource scheduling is started, the eNodeB grants the radio resource to the UE at an increased frequency. As shown in FIG. 7, the eNodeB continues to grant the radio resource to the UE in a downlink subframe 703. In a same time period, according to the existing resource scheduling manner shown in FIG. 4, the UE can report data only once. However, according to the coordinated radio resource scheduling mode shown in FIG. 7, the UE can report data for three times, and a frequency of data reporting is greatly increased, and an uplink latency is significantly shortened.

Figure 8:
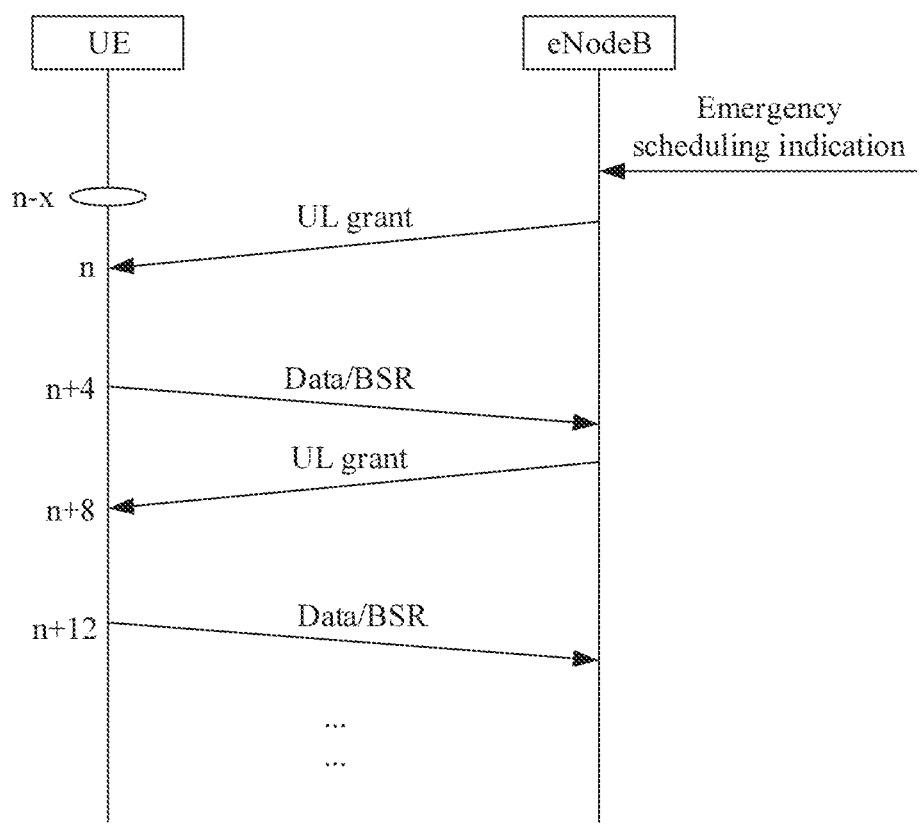
FIG. 8 is a schematic diagram of another coordinated radio resource scheduling according to an embodiment of the present disclosure.

FIG. 8 is a schematic diagram of coordinated radio resource scheduling in an FDD-LTE technology. An effect of FIG. 8 compared with FIG. 5 is similar to that of FIG. 7 compared with FIG. 4. This is not described herein again. It should be noted that FIG. 7 and FIG. 8 are merely a schematic diagram of a scheduling mode after the eNodeB starts the coordinated radio resource scheduling. In this application, the scheduling mode of the coordinated radio resource scheduling is not limited. After receiving the indication for enabling the coordinated radio resource scheduling, the radio transceiver node may select a radio resource scheduling mode based on a specified mode, a parameter in a coordinated radio resource scheduling request, or a configuration parameter of the radio transceiver node. As shown in FIG. 7, after receiving the indication for the coordinated radio resource scheduling at moment of a subframe 700, the eNodeB may select any downlink subframe to send a UL grant message to the UE. The frequency at which the eNodeB delivers a UL grant radio resource to the UE may also be adjusted based on a configuration of the eNodeB. After delivering the UL grant message for the first time in a downlink subframe 701, the eNodeB may select to deliver the UL grant message again in any subsequent downlink subframe of 701.

It should be noted that in FIG. 4, FIG. 5, FIG. 7, and FIG. 8, the coordinated radio resource scheduling is described using 4G radio access technologies TDD-LTE and FDD-LTE as examples. However, a person skilled in the art should understand that the coordinated radio resource scheduling technical solution provided in this application is also applicable to another radio access technology that allocates a radio resource based on a terminal or UE. Provided that the radio transceiver node can learn, under an instruction of the Internet of things application server, that the coordinated radio resource scheduling needs to be performed on a specific terminal, the radio transceiver node may perform, based on a radio technology used by the radio transceiver node, radio resource scheduling in a specific mode and coordinated radio resource scheduling on a specified terminal. The radio resource scheduling in this specific mode is different from a conventional scheduling manner in a radio access technology, and may be to increase or decrease a scheduling priority, or may be to accelerate or slow down a scheduling frequency, or may be to actively allocate a resource to a terminal. This application does not limit a scheduling mode of the coordinated radio resource scheduling.

The foregoing describes a system architecture and an overall inventive concept of the technical solution provided in this application. As shown in FIG. 6, the Internet of things application server needs to cooperate with the radio transceiver node to perform radio resource scheduling on a specified terminal, and the Internet of things application server needs to at least notify the radio transceiver node of an identifier of UE that needs to perform coordinated radio resource scheduling and an indication of the coordinated radio resource scheduling. The identifier of the UE is an identifier of a UE that can be uniquely identified by the radio transceiver node. A specific type and format of the identifier of the UE are not limited in this application, and may be an international mobile subscriber identification number (IMSI), a globally unique temporary UE identity (GUTI), a mobile station international integrated services digital network (ISDN) number (MSISDN), or another type of identifier. In addition, in an embodiment deployment process of the solution, to optimize or improve the solution, the following technical factors may be additionally considered.

Figure 9:
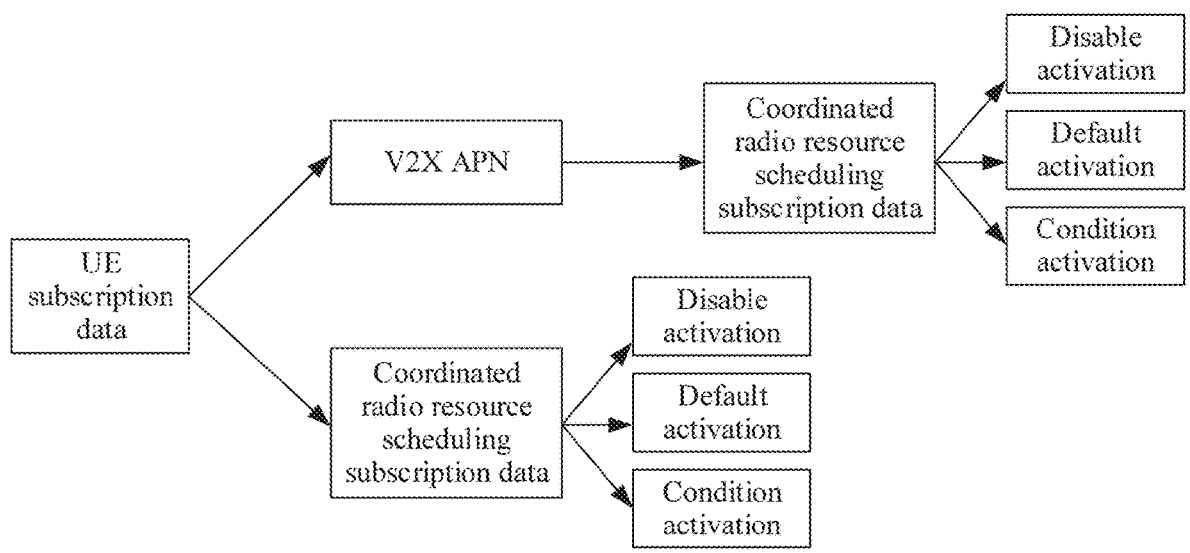
FIG. 9 is a schematic diagram of user subscription data including coordinated radio resource scheduling information according to an embodiment of the present disclosure.

First, because the coordinated radio resource scheduling breaks down communication fairness and efficiency balance in a conventional radio scheduling mode, a communications network, as a provider of a network (including wired and wireless) resource, needs to control the coordinated radio resource scheduling. The V2X AS notifies the communications network of a vehicle that needs to perform coordinated radio resource scheduling, and the communications network finally determines whether to start coordinated radio resource scheduling for the vehicle. The communications network may decide based on traffic control, for example, allow only a limited quantity of emergency resource scheduling requests per unit time. The communications network may further determine based on subscription data. For example, after receiving a request for enabling the coordinated radio resource scheduling for a UE, the communications network queries whether the UE subscribes to the coordinated radio resource scheduling. Only when the UE subscribes to the coordinated radio resource scheduling, the communications network allows the coordinated radio resource scheduling to be started for the UE. A subscription of the coordinated radio resource scheduling may be at a granularity of the UE, or may be at a granularity of an APN in the subscription data of the UE. The APN refers to that the UE accesses an external network other than the communications network in a specific manner. There are many types of external networks, such as the Internet, an internal network of a group enterprise, an internal private network of an industry, and a V2X. Each APN may have a plurality of packet data network (PDN) connections. As shown in FIG. 9, the subscription data of the coordinated radio resource scheduling may be stored as independent data in the subscription data of the UE, or may be data bound to an APN. A specific value of the subscription data of the coordinated radio resource scheduling may be disabled activation, may be default activation, or may be conditional activation.

Next, as shown in 604 in FIG. 6, after the radio transceiver node schedules a radio resource for the UE, to enable the UE to clearly understand a service for which coordinated radio resource scheduling is performed on the communications network such that the UE can preferentially report data related to the service using a resource of the coordinated radio resource scheduling, the radio transceiver node needs to notify the UE of an identifier related to the service, such as a bearer identifier or an identifier of an application layer. In addition, as shown in FIG. 9, when the coordinated radio resource scheduling data subscribed by the UE is bound to the V2X APN, the communications network also needs to learn information about a PDN connection between the UE and the V2X AS in order to obtain an APN to which the PDN connection belongs in order to determine whether the coordinated radio resource scheduling can be started on the UE. Therefore, when sending the coordinated radio resource scheduling request to the communications network, the V2X AS may further carry the service identifier of the application layer or service flow information of a bearer plane or the bearer identifier in order to identify that the coordinated radio resource scheduling needs to be performed on a specific Internet of things service.

In addition, although a coordinated radio resource scheduling mechanism or mode on a radio transceiver node side is not limited in this application as described in FIG. 7, the V2X AS may still carry a coordinated radio resource scheduling latency requirement in a coordinated radio resource scheduling indication or request message such that the radio transceiver node adjusts a priority of the coordinated radio resource scheduling based on an urgent degree of the coordinated radio resource scheduling latency requirement, for example, performing resource scheduling on UE with a shortest latency requirement using a highest priority or a highest frequency.

Finally, to further improve coordinated radio resource scheduling efficiency, the V2X AS may add a coordinated radio resource scheduling uplink packet period or an uplink packet moment to the message 603, and the radio transceiver node further sends the coordinated radio resource scheduling uplink packet period or the uplink packet moment to the UE using the message 604. Therefore, the coordinated radio resource scheduling on the radio transceiver node side may be aligned with a speed of the uplink packet of the UE in order to avoid a radio resource waste caused by a period or a moment at which the radio transceiver node allocates a radio resource to the UE that is inconsistent with a period or a moment at which the UE side sends the uplink packet. In addition, as described above, when the UE cannot report all data in a message, the UE adds a BSR to the reported message in order to instruct the eNodeB to continue to allocate a radio resource to the UE. In this way, the UE needs to wait for next or more resource allocation to complete reporting of all data. The V2X AS also needs to wait until all data packets have been uploaded to parse and process the complete data packets, thereby increasing a latency of processing and responding by the V2X AS to an event on the UE side. Therefore, the V2X AS may further add a coordinated radio resource scheduling uplink packet size to the message 603, and the radio transceiver node sends the coordinated radio resource scheduling uplink packet size to the UE using the message 604. In this way, it can be ensured that the radio resource allocated by the radio transceiver node can meet emergency or low-latency communication performed by the UE based on the agreed uplink packet size, in an embodiment, the radio transceiver node allocates enough radio resources at one time, and the UE can also encapsulate the data based on a same specification, and try to upload data that needs to be uploaded in one uplink message.

Figure 10:
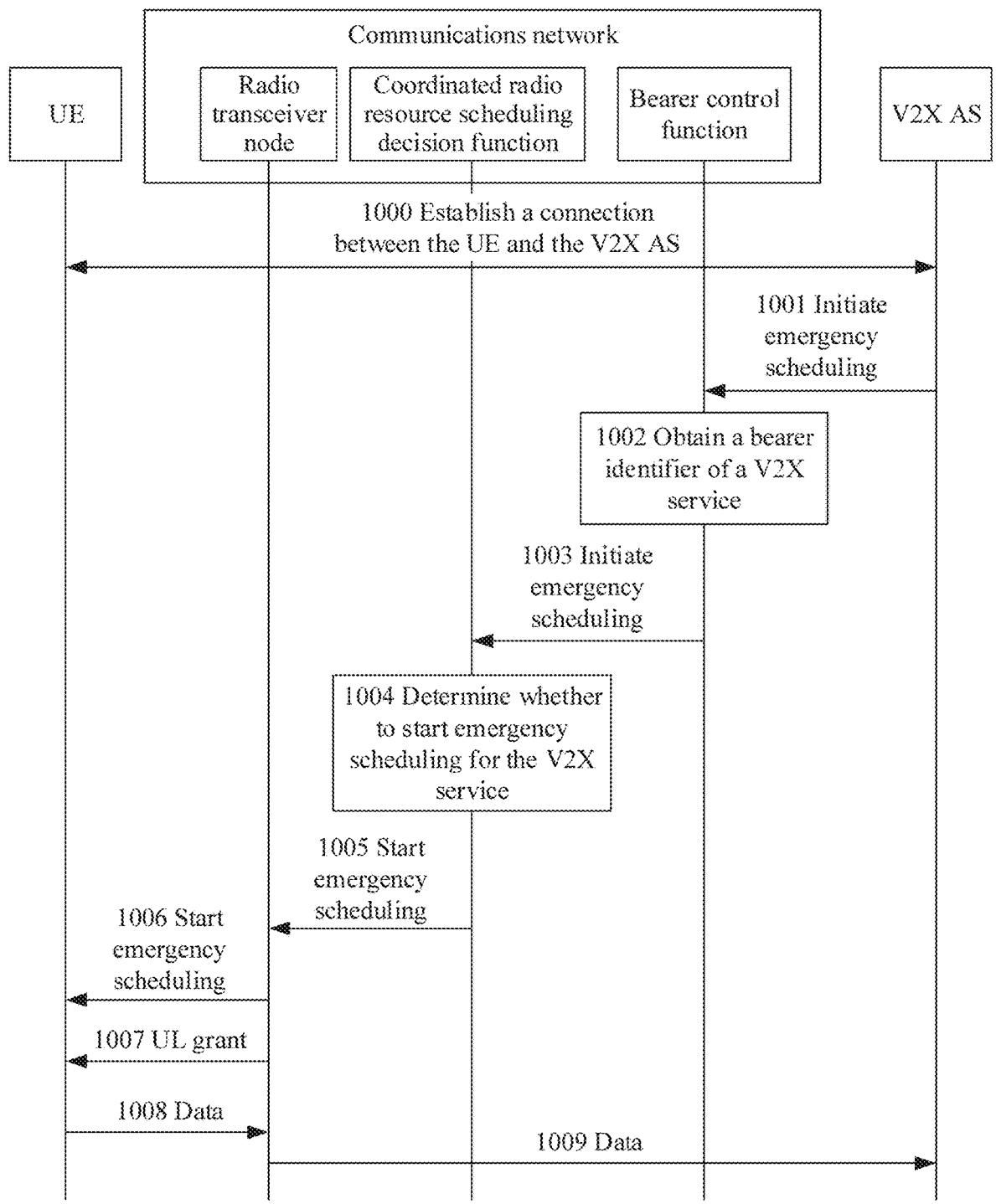
FIG. 10 is a schematic flowchart of a coordinated radio resource scheduling method according to an embodiment of the present disclosure.

Based on consideration of the foregoing technical solution, FIG. 10 is a schematic flowchart of a method of the technical solution. A coordinated radio resource scheduling decision function in FIG. 10 is used to control the coordinated radio resource scheduling function in a communications network, receive a coordinated radio resource scheduling requirement from a V2X AS, and be responsible for finally determining whether to start coordinated radio resource scheduling. A bearer control function is used to obtain, based on V2X service flow information sent by the V2X AS, a bearer identifier that can be identified by a communications network internal device or function (such as a coordinated radio resource scheduling decision function and a radio transceiver node) corresponding to a V2X service. The two names of the coordinated radio resource scheduling decision function and the bearer control function are merely a summary of the foregoing two logical functions. This application is not limited to a communications network element or a communications device that specifically implements the foregoing functions. For example, any one of the foregoing functions may be implemented by one communications network element or device alone, or may be implemented by a plurality of communications network elements or devices together. In this embodiment, a purpose of an indication is implemented in a manner of newly adding a coordinated radio resource scheduling activation indication, and a technical solution of implementing the indication in another manner (for example, using a message name indication) is also within the protection scope of this application.

1000. UE establishes a connection to the V2X AS using radio transceiver node, and the UE reports vehicle-related data to the V2X AS.

1001. The V2X AS identifies that V2X service coordinated radio resource scheduling needs to be performed on the UE, and sends a message to the communications network to request coordinated radio resource scheduling, where the message includes an identifier of the UE, a V2X service flow information (including information such as an Internet protocol (IP) address, a port number, a protocol, and bandwidth), and a coordinated radio resource scheduling activation indication, and optionally, may further include information such as a V2X service identifier, a coordinated radio resource scheduling latency requirement, a coordinated radio resource scheduling uplink packet size, and a coordinated radio resource scheduling uplink packet period or uplink packet moment.

1002. The bearer control function receives a request message from the V2X AS, and obtains a corresponding V2X service bearer identifier based on the V2X service flow information in the message, where the V2X service bearer identifier is an identifier that can be identified by both the coordinated radio resource scheduling decision function and the radio transceiver node in the communications network. It should be noted that both the V2X service identifier and the V2X service bearer identifier that are mentioned in this application may be used to identify the V2X service, the V2X service identifier is an application layer identifier, and is used by a V2X server and the UE to identify the V2X service, and the V2X service bearer identifier is an identifier of a user plane or a bearer plane, and is used by a device or a network element in the communications network to identify a bearer of the V2X service flow.

1003. The bearer control function forwards a coordinated radio resource scheduling request message to the coordinated radio resource scheduling decision function, where the message in 1003 includes at least the identifier of the UE, the V2X service flow information, the V2X service hearer identifier, and the coordinated radio resource scheduling activation indication. When the message in 1001 includes the information such as the V2X service identifier, the coordinated radio resource scheduling latency requirement, the coordinated radio resource scheduling uplink packet size, the coordinated radio resource scheduling uplink packet period, and the coordinated radio resource scheduling uplink packet moment, the bearer control function also includes the optional information in the message in 1003.

1004. The coordinated radio resource scheduling decision function receives the coordinated radio resource scheduling request message, and determines whether coordinated radio resource scheduling is allowed to be started for the V2X service. It is assumed that the coordinated radio resource scheduling decision function determines based on the subscription data of the UE shown in FIG. 9, and the subscription data related to the coordinated radio resource scheduling is bound to the V2X APN, the coordinated radio resource scheduling decision function determines a corresponding V2X APN based on the V2X service bearer identifier and the V2X service flow information, and then determines, based on the subscription data of the UE, whether the V2X APN is allowed to activate the coordinated radio resource scheduling.

1005. When the coordinated radio resource scheduling decision function allows activation based on a subscription data decision, the coordinated radio resource scheduling decision function forwards the coordinated radio resource scheduling request message to the radio transceiver node, where content included in the message is described in 1003.

1006. The radio transceiver node forwards the received request message in 1005 to the UE.

1007. The radio transceiver node actively grants a radio resource to the UE based on the coordinated radio resource scheduling activation indication and other possible information that is obtained in the message in 1005.

1008. The UE reports data based on the information received in the message in 1006 using the radio resource allocated by the radio transceiver node. For example, based on the coordinated radio resource scheduling activation indication and the coordinated radio resource scheduling latency requirement, when the UE receives an uplink radio resource allocated using UL_Grant, the UE preferentially allocates the uplink radio resource to a V2X service uplink packet. Based on the coordinated radio resource scheduling uplink packet size, an uplink packet size reported by the UE should be the same as the coordinated radio resource scheduling uplink packet size. Based on the coordinated radio resource scheduling uplink packet period or uplink packet moment, a period and a moment at which the UE sends an uplink packet are aligned with a speed of coordinated radio resource scheduling of the eNodeB in order to minimize an uplink latency.

1009. The radio transceiver node forwards data to the V2X AS.

For specific radio side resource scheduling corresponding to 1007 to 1009, refer to FIG. 7 or FIG. 8.

It should be noted that the message name shown in FIG. 10 is merely a summary of a function or an objective to be implemented using the message. During specific solution implementation, a person skilled in the art may select a proper message to implement the function of the message in FIG. 10 based on a specific communications network type and a selected communication protocol. Compared with 603 in FIG. 6, 1001 to 1005 in FIG. 10 are used to further improve and optimize for how the V2X AS instructs the radio transceiver node to perform coordinated radio resource scheduling.

Figure 11:
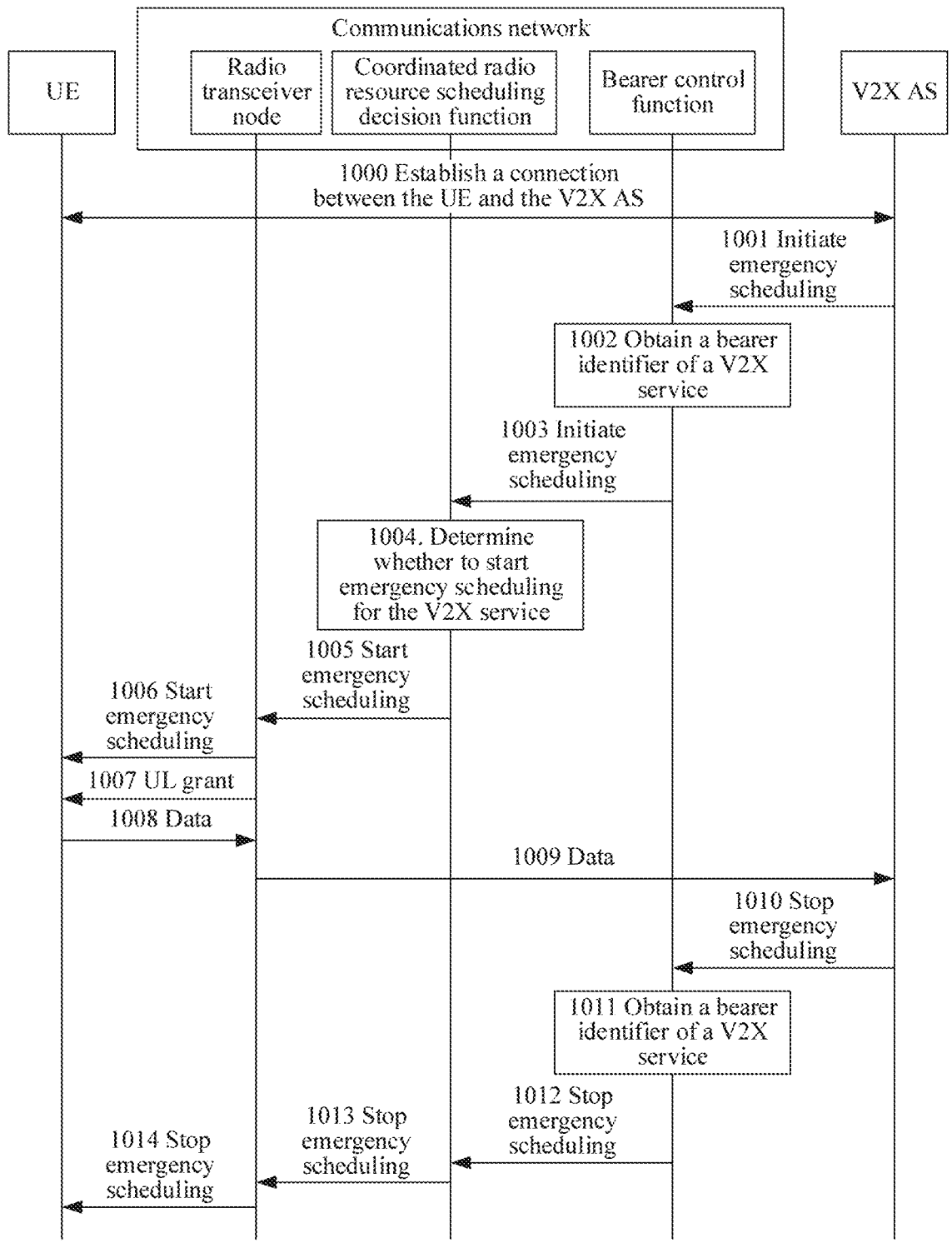
FIG. 11 is a schematic flowchart of another coordinated radio resource scheduling method according to an embodiment of the present disclosure.

It may be understood that when the V2X AS determines, based on data analysis, that the coordinated radio resource scheduling does not need to be performed on the UE, as shown in the message 606 in FIG. 6, the V2X AS further needs to instruct the radio transceiver node to deactivate the coordinated radio resource scheduling. FIG. 11 is a deactivation coordinated radio resource scheduling procedure corresponding to FIG. 10, where 1000 to 1009 are the same as the descriptions in FIG. 10. When the V2X AS determines that the coordinated radio resource scheduling does not need to be performed on the UE, the V2X AS sends a coordinated radio resource scheduling stopping message 1010 to the bearer control function, where the message includes at least the identifier of the UE, the V2X service flow information (including information such as the IP address, the port number, the protocol, and the bandwidth), and a coordinated radio resource scheduling deactivation indication, and the bearer control function obtains, in step 1011, the V2X service bearer identifier that corresponds to the V2X service flow information, and add the V2X service bearer identifier to 1012. The coordinated radio resource scheduling decision function receives a message 1012, and directly forwards the message to the radio transceiver node, such as a message 1013. Optionally, the radio transceiver node may further forward the message to the UE (for example, a message 1014) in order to indicate that the UE does not need to preferentially send data of a specific service, and does not need to perform special message encapsulation and reporting according to an instruction of the message in 1006.

Figure 12:
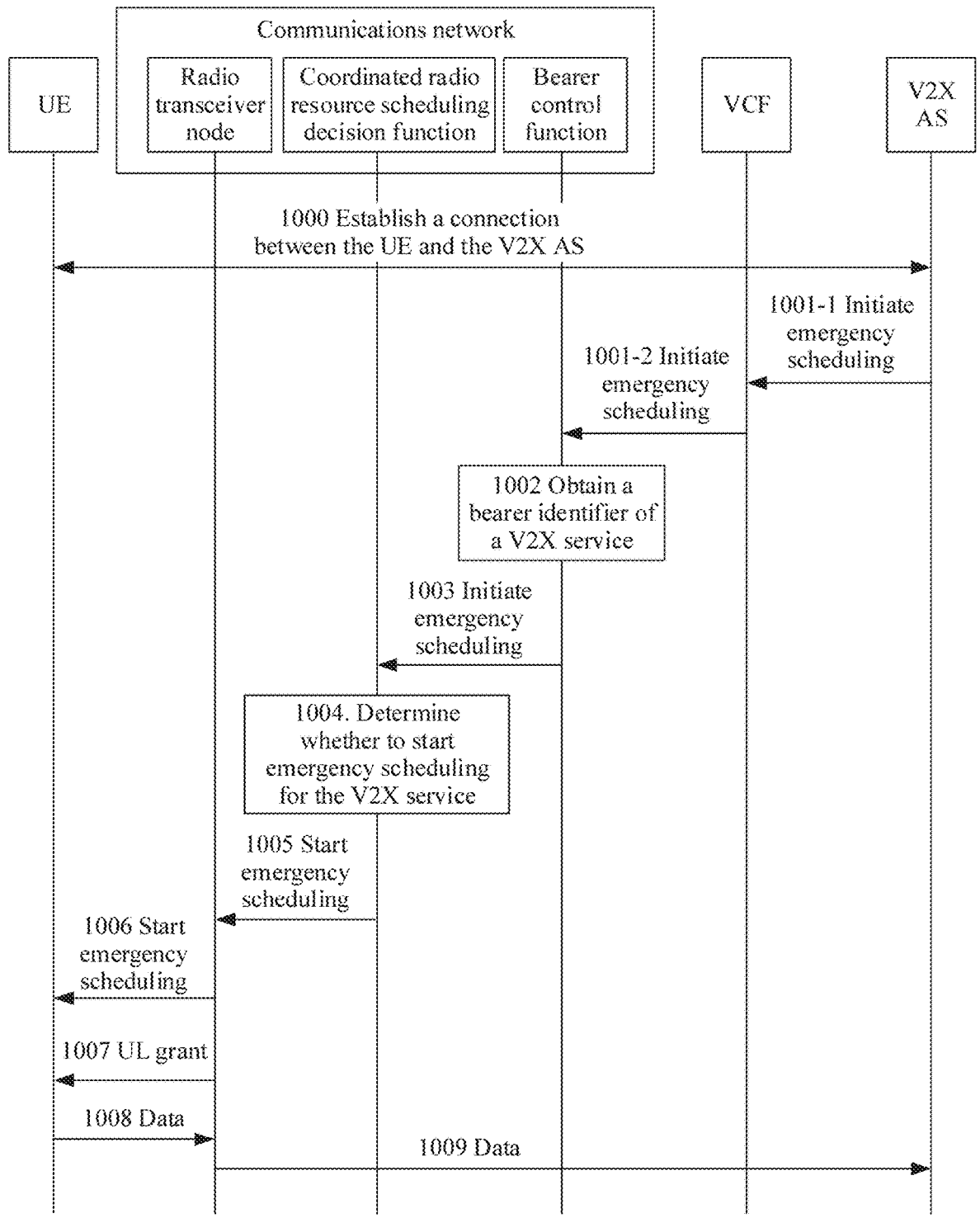
FIG. 12 is a schematic flowchart of still another coordinated radio resource scheduling method according to an embodiment of the present disclosure.

The V2X AS may further initiate a coordinated radio resource scheduling request to the communications network using a VCF. As shown in FIG. 12, a procedure shown in FIG. 12 is basically the same as that in FIG. 10. A difference between the procedures is that the message 1000 in FIG. 10 corresponds to a message 1001-2 in FIG. 12. Content included in the message 1001-1 in FIG. 12 may be the same as that in the message 1000. In a case in which the VCF participates in connection establishment between the UE and the V2X AS, the message 1001-1 may also include only the V2X service identifier at an application layer, and the VCF determines corresponding V2X service flow information based on the V2X service identifier at the application layer, and adds the V2X service flow information to the message 1001-2.

Figure 13:
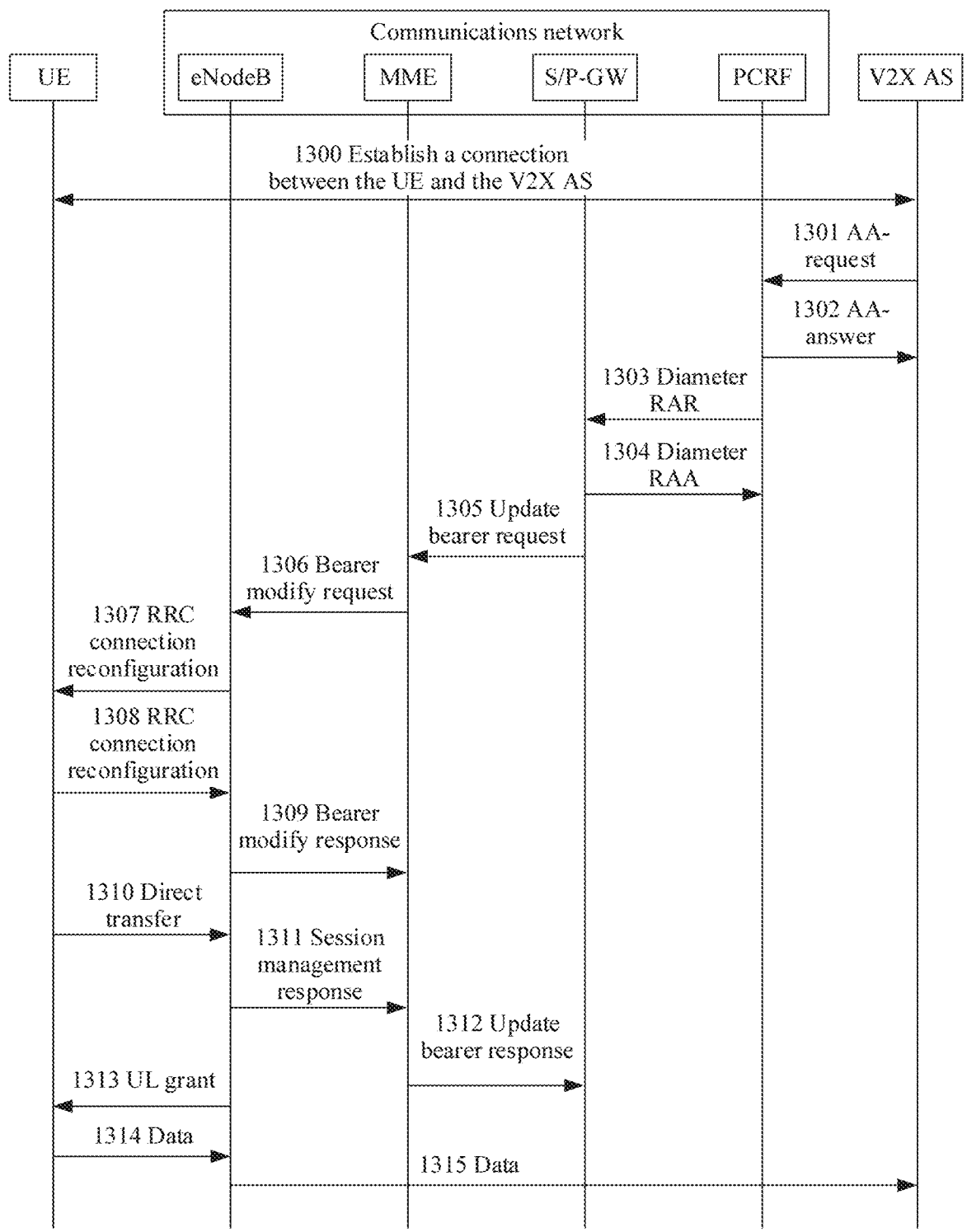
FIG. 13 is a schematic flowchart of a coordinated radio resource scheduling method in a 4G communications network according to an embodiment of the present disclosure.

Based on the technical solution summary described in FIG. 10, a 4G communications network is used as an example. FIG. 13 is a message flowchart of implementing the technical solution in the 4G communications network. In FIG. 13, a bearer update procedure in the 4G communications network is reused to implement the technical solution shown in FIG. 10. A PCRF and an S/PGW in FIG. 13 jointly implement the bearer control function in FIG. 10, and an MME in FIG. 13 implements the coordinated radio resource scheduling decision function in FIG. 10. A specific message flow is described as follows, and only a part of the reused other approaches that is strongly related to the technical solution is emphatically described.

1300. The UE establishes a connection to the V2X AS using the 4G communications network, and a bearer between the UE and the V2X AS is performed using the eNodeB and the S/P-GW. In addition, the MME and the PCRF also participate in a signaling process of establishing the bearer.

1301. The V2X AS sends an Authentication and Authorization (AA)-request message to the PCRF to request emergency resource scheduling. As described in 1001, the AA-request message includes at least an identifier of the UE, V2X service flow information (including information such as an IP address, a port number, a protocol, and bandwidth), a coordinated radio resource scheduling activation indication, and optionally, may further include information such as a coordinated radio resource scheduling latency requirement, a coordinated radio resource scheduling uplink packet size, and a coordinated radio resource scheduling uplink packet period or uplink packet moment.

1303. The PCRF obtains a corresponding quality control information (QCI) and an address resolution protocol (ARP) based on the service flow information provided by the V2X AS, the PCRF adds the QCI and the ARP to the received message in 1301, and forwards the request to the S/P-GW using an re-authentication request (RAR) message.

1304. The S/P-GW obtains a corresponding bearer identifier based on the information related to the service flow and the QCI and the ARP information that are transmitted by the PCRF, adds the bearer identifier to the received message in 1303, and then sends a coordinated radio resource scheduling request message to the MME in a form of an update bearer request message.

Figure 15:
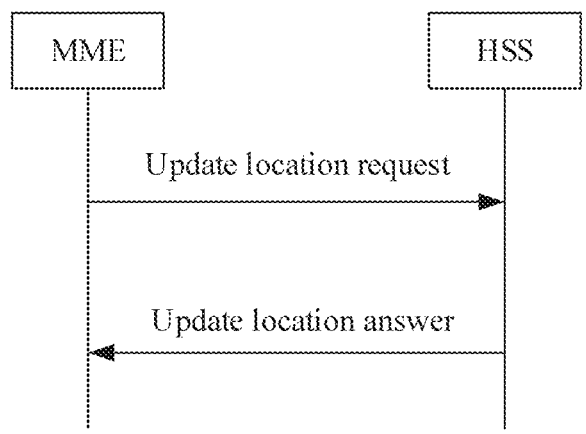
FIG. 15 is a schematic flowchart of a coordinated radio resource scheduling subscription obtaining method in a 4G network according to an embodiment of the present disclosure.
Figure 16:
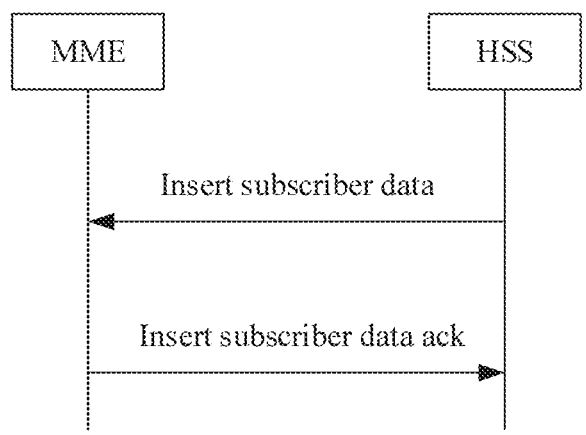
FIG. 16 is a schematic flowchart of another coordinated radio resource scheduling subscription obtaining method in a 4G network according to an embodiment of the present disclosure.

1306. The MME determines a corresponding V2X APN based on the received service flow information and bearer identification information, and then determines whether activation of coordinated radio resource scheduling is allowed in subscription information. When the subscription information allows activation of the coordinated radio resource scheduling, the MME sends a bearer modify request message to the eNodeB, where the session modify request message is packetized. The bearer modify request message and the session modify request message include at least the identifier of the UE, the bearer identifier, and an indication for activating the coordinated radio resource scheduling. Optionally, the bearer modify request message and the session modify request message may further include at least one piece of information of the coordinated radio resource scheduling latency requirement, the coordinated radio resource scheduling uplink packet size, the coordinated radio resource scheduling uplink packet period or uplink packet moment. The bearer modify request message is used to instruct the eNodeB to start the coordinated radio resource scheduling, and is an example of the message in 603 or 1005. The session modify request message is used to instruct the UE to start the coordinated radio resource scheduling, and is an example of the message in 604 or 1006. It should be noted that as shown in FIG. 15, the MME may obtain subscription data of a user from an HSS in a process in which the UE is attached, as shown in FIG. 16, when the subscription data of the user changes, the HSS also actively instructs the MME to update the subscription data of the user, and as shown in FIG. 9, the subscription data of the user includes coordinated radio resource scheduling subscription data.

1307. The radio transceiver node packetizes the session modify request message into a Radio Resource Control (RRC) connection reconfiguration message and sends the RRC connection reconfiguration message to the UE. 1307 may be considered as an example of the message in 604 or 1006.

1313 to 1009. For details, refer to descriptions in 1007 to 1009.

It should be noted that the messages 1308 to 1313 are all inherent messages in an existing 4G bearer update procedure. The technical solution of this application does not change these messages. Details are not described again. It may be understood that the deactivation coordinated radio resource scheduling in FIG. 11 may also be implemented by reusing the bearer update procedure in FIG. 13. In the 4G communications network, a procedure of implementing deactivation coordinated radio resource scheduling using the bearer update procedure is basically the same as steps 1301 to 1312 in FIG. 13. A difference lies in that, in the deactivation procedure, a downlink message (1301, 1303, 1305, 1306, and 1307) from the V2X AS to the UE carries a deactivation coordinated radio resource scheduling indication. In addition, the downlink message in the deactivation procedure does not carry the coordinated radio resource scheduling latency requirement, the coordinated radio resource scheduling uplink packet size, and the coordinated radio resource scheduling uplink packet period or uplink packet moment. It should be further noted that, in FIG. 13, the V2X AS may also directly send an activation coordinated radio resource scheduling message to the S/PGW such that the S/PGW implements the bearer control function in FIG. 10. Content of the message sent by the V2X AS to the S/PGW is similar to that of step 1301. Details are not described herein again.

Figure 14:
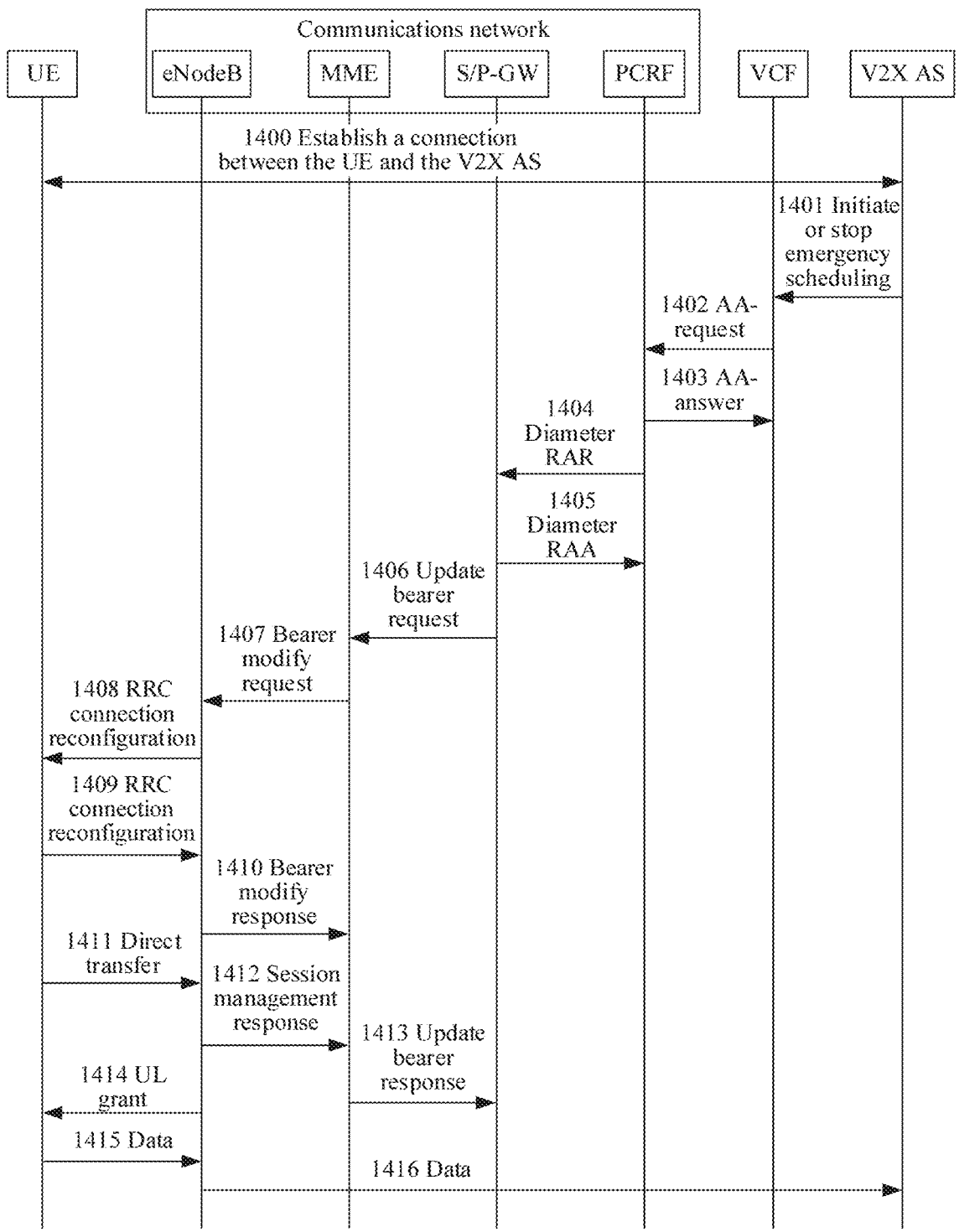
FIG. 14 is a schematic flowchart of another coordinated radio resource scheduling method in a 4G communications network according to an embodiment of the present disclosure.

In addition, as shown in FIG. 14, the method for initiating the coordinated radio resource scheduling using the VCF by the V2X AS shown in FIG. 12 may also be implemented by reusing the bearer update procedure. A procedure shown in FIG. 14 is basically the same as that in FIG. 13. A difference lies in that in FIG. 14, the V2X AS sends, using the VCF, coordinated radio resource scheduling initiation or termination to the 4G communications network. 1402 to 1406 are the same as 1301 to 1305. A message 1401 includes at least an identifier of the UE, V2X service flow information (including information such as an IP address, a port number, a protocol, and bandwidth), a coordinated radio resource scheduling activation indication, and optionally, may further include information such as a coordinated radio resource scheduling requirement latency, a coordinated radio resource scheduling uplink packet size, a coordinated radio resource scheduling uplink packet period or uplink packet moment. Similarly, a method for stopping the coordinated radio resource scheduling by the V2X AS using the VCF may also be implemented by reusing the bearer update process. Details are not described herein again.

Figure 17:
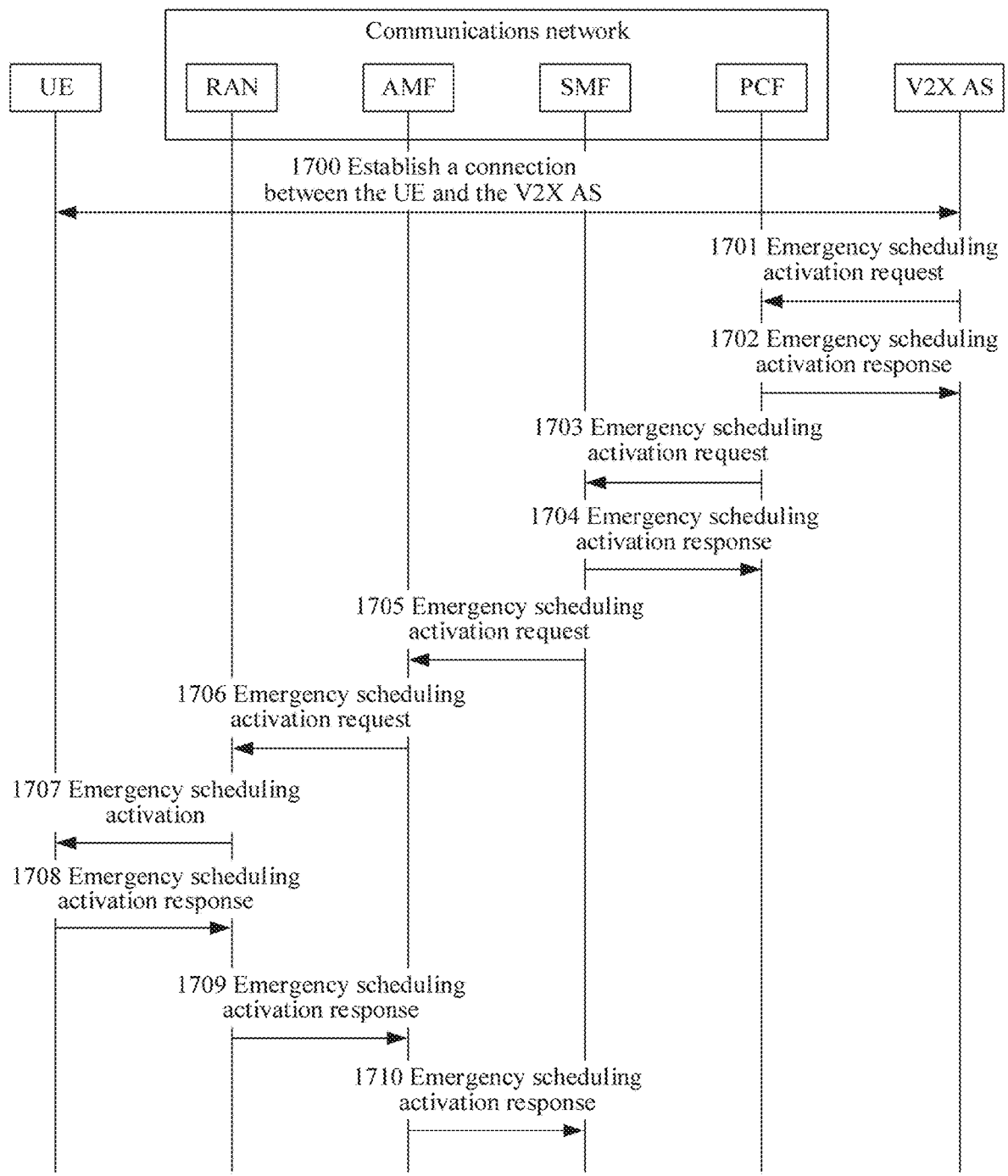
FIG. 17 is a schematic flowchart of a coordinated radio resource scheduling method in a 5G communications network according to an embodiment of the present disclosure.

FIG. 13 to FIG. 16 are possible specific implementations of the technical solution provided in this application in a 4G communications network. As described above, the technical solution provided in this application is not limited to a specific communications network type, and may also be applicable to a 5G or another type of communications network. FIG. 17 shows a possible implementation of implementing this solution in a 5G communications network using the 5G communications network as an example. It should be noted that a name of a network element or a device in the 5G communications network shown in FIG. 17 is merely an example, and is not limited. Regardless of a change of a name or a form of these network elements in the future, provided that a function of this solution is implemented, the network element or the device is within the protection scope of this application. It should be further noted that, as the date of submission of this application, a standard of the 5G communications network is still not perfect and a message procedure between network elements is still being discussed, a message name in the flowchart shown in FIG. 17 is only an example. A PCF, an SMF, an AMF, and a RAN in FIG. 17 respectively execute functions of the PCRF, the S/P-GW, the MME, and the eNodeB in coordinated radio resource scheduling activation in FIG. 13. A message procedure in FIG. 17 is basically the same as that in FIG. 13. Details are not described herein again. Another point is different from FIG. 13. In FIG. 17, the AMF obtains subscription data of a user from a UDM, and the subscription data of the user includes coordinated radio resource scheduling subscription data, and when the subscription data of the user changes, the UDM also instructs the AMF to update the subscription data of the user.

It should be noted that a path and a manner of forwarding a coordinated radio resource scheduling indication message in a communications network are not limited in this application. As shown in FIG. 13, FIG. 14, and FIG. 17, the V2X AS or the VCF may be directly connected to the PCRF or the PCF, or may first send a message to an SCEF or a NET, and then the SCEF or the NEF forwards the message to the PCRF or the PCF. Certainly, the SCEF or the NEF may also directly forward the message to the MME or the AMF. A person skilled in the art may also use another path to implement message forwarding from the V2X AS to the radio transceiver node.

The method and the procedure of the technical solution provided in this application is described above. The method relates to at least the V2X AS and the radio transceiver node, and may further include function entities such as the VCF, the bearer control function, the coordinated radio resource scheduling decision function, and the UE. It may be understood that, to implement the foregoing functions, each network element such as the UE, the radio transceiver node, and a communications network entity includes a corresponding hardware structure and/or software module for performing each function. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

Figure 18:
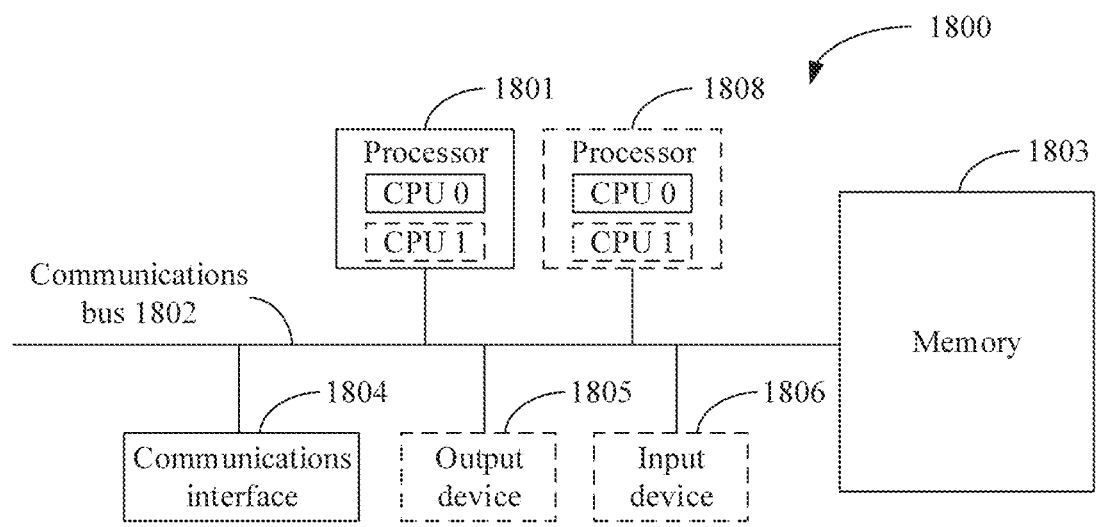
FIG. 18 is a schematic diagram of a computer device according to an embodiment of the present disclosure.

For example, as shown in FIG. 18, the IoT application server (such as the V2X AS), the IoT platform (such as the VCF), the bearer control function, the coordinated radio resource scheduling decision function, and the UE in this application may be implemented using a computer device a system) in FIG. 18.

FIG. 18 is a schematic diagram of a computer device according to an embodiment of the present disclosure. A computer device 1800 includes at least one processor 1801, a communications bus 1802, a memory 1803, and at least one communications interface 1804.

The processor 1801 may be a general-purpose central processing unit (CPU), a microprocessor, an application-specific integrated circuit (ASIC), or one or more integrated circuits for controlling program execution of the solutions of the present disclosure.

The communications bus 1802 may include a channel in which information is transmitted between the foregoing components.

The communications interface 1804, which uses any apparatus such as a transceiver, is configured to communicate with another device, such as Ethernet, a RAN, or a wireless local area network (WLAN).

The memory 1803 may be a read-only memory (ROM) or another type of static storage device capable of storing static information and instructions, a random access memory (RAM) or another type of dynamic storage device capable of storing information and instructions, or may be an electrically erasable programmable read-only memory (EEPROM), a compact disc read-only memory (CD-ROM), or other compact disc storage or optical disc storage (including a compressed optical disc, a laser disc, an optical disc, a digital versatile disc, a BLUE-RAY optical disc, and the like), a magnetic disk storage medium or another magnetic storage device, or any other medium capable of carrying or storing expected program code in a form of instructions or data structures and capable of being accessed by a computer, but is not limited thereto. The memory may exist independently and is connected to the processor using a bus. The memory may be alternatively integrated with the processor.

The memory 1803 is configured to store application program code used to execute the solution of the present disclosure, where the application program code is executed under control of the processor 1801. The processor 1801 is configured to execute the application program code stored in the memory 1803 in order to implement a function of the V2X AS, the VCF, the bearer control function, the coordinated radio resource scheduling decision function, or the UE in the method in this patent.

During specific implementation, in an embodiment, the processor 1801 may include one or more CPUs, for example, a CPU 0 and a CPU 1 in FIG. 18.

In specific implementation, in an embodiment, the computer device 1800 may include a plurality of processors such as the processor 1801 and a processor 1808 in FIG. 18. Each of the processors may be a single-core processor, or may be a multi-core processor. The processor herein may be one or more devices, circuits, and/or processing cores for processing data (for example, a computer program instruction).

During specific implementation, in an embodiment, the computer device 1800 may further include an output device 1805 and an input device 1806. The output device 1805 communicates with the processor 1801, and may display information in a plurality of manners. For example, the output device 1805 may be a liquid crystal display (LCD), a light emitting diode (LED) display device, a cathode ray tube (CRT) display device, or a projector. The input device 1806 communicates with the processor 1801, and may receive a user input in a plurality of manners. For example, the input device 1806 may be a mouse, a keyboard, a touchscreen device, or a sensing device.

The computer device 1800 may be a general-purpose computer device or a dedicated computer device. In specific implementation, the computer device 1800 may be a desktop computer, a portable computer, a network server, a personal digital assistant (PDA), a mobile phone, a tablet computer, a wireless terminal device, a communications device, an embedded device, or a device having a structure similar to that in FIG. 18. A type of the computer device 1800 is not limited in this embodiment of the present disclosure.

In the embodiments of the present disclosure, functional modules of the V2X AS, the bearer control function, or the coordinated radio resource scheduling decision function may be obtained through division. For example, each functional module may be obtained through division based on each function, or two or more functions may be integrated into one functional module. The integrated module may be implemented in a form of hardware, or may be implemented in a form of a software functional module. It should be noted that, in this embodiment of the present disclosure, module division is an example, and is merely a logical function division. In an embodiment, another division manner may be used.

Figure 19:
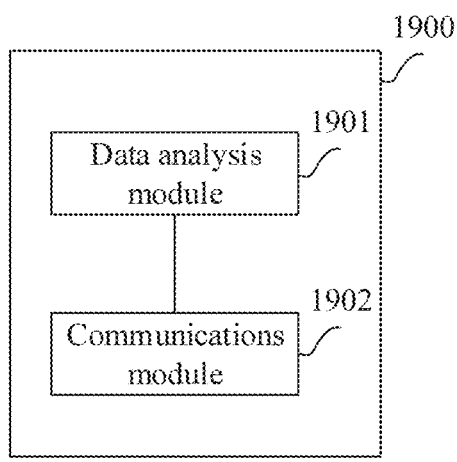
FIG. 19 is a schematic diagram of a functional module of an Internet of things application server according to an embodiment of the present disclosure.

FIG. 19 is a schematic diagram of a possible functional module of the V2X AS in the foregoing embodiment. A device 1900 includes a data analysis module 1901 and a communications module 1902. The communications module 1902 is configured to communicate with an external function, including receiving data reported by UE, and sending an activation or deactivation coordinated radio resource scheduling indication to a communications network. The data analysis module 1901 analyzes received data. When determining that coordinated radio resource scheduling needs to be performed on the UE, the data analysis module sends a request message to the communications network using the communications module 1902. For a specific method procedure, refer to the foregoing description. Details are not described herein again.

Figure 20:
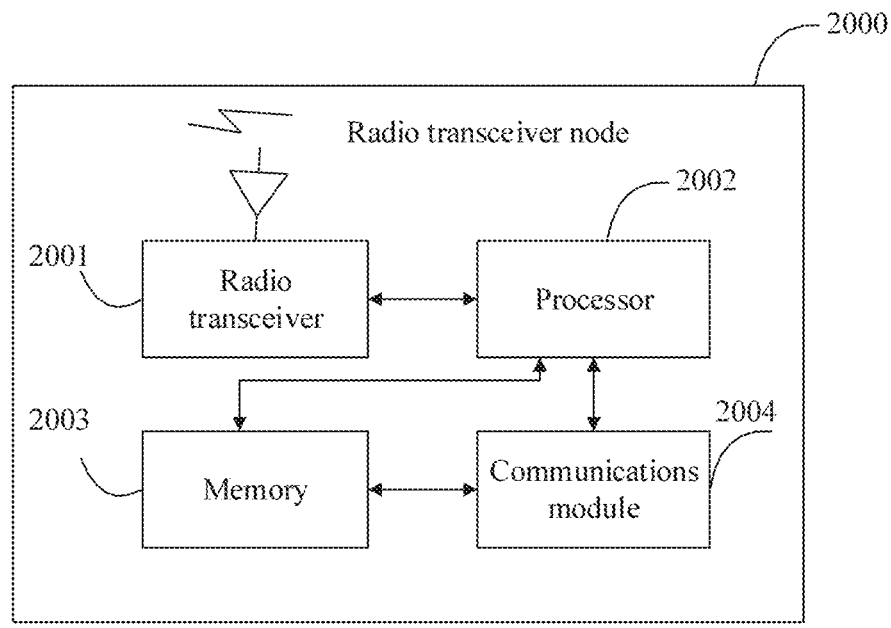
FIG. 20 is a schematic diagram of a functional module of a radio transceiver node according to an embodiment of the present disclosure.

FIG. 20 is a possible schematic structural diagram of a radio transceiver node in the foregoing embodiments. The radio transceiver node includes a radio transceiver 2001, a processor 2002, a memory 2003, and a communications module 2004. The radio transceiver 2001 is configured to support information receiving and sending between the radio transceiver node and the UE in the foregoing embodiment. The processor 2002 performs various related functions for communicating with the UE. In an uplink, an uplink signal from the UE is received by an antenna, is demodulated by the radio transceiver 2001, and is further processed by the processor 2002 to restore service data and a signaling message that are sent by the UE. In a downlink, service data and a signaling message are processed by the processor 2002, and are demodulated by the radio transceiver 2001 to generate a downlink signal, and the downlink signal is transmitted to the UE using an antenna. The processor 2002 further performs a processing process related to coordinated radio resource scheduling in this application. For example, the processor 2002 processes the coordinated radio resource scheduling activation indication received by the communications module 2004 from the V2X AS, and sends a UL grant message to the UE using the radio transceiver 2001. The memory 2003 is configured to store program code and data of the base station. The communications module 2004 is configured to support the radio transceiver node in communicating with another communications network entity and an Internet of things application server.

Figure 21A:
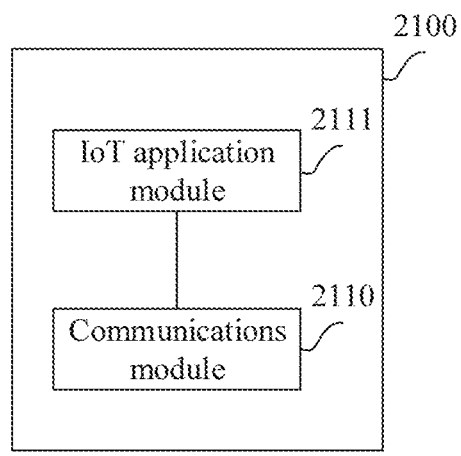
FIG. 21A is a schematic diagram of a functional module of a terminal according to an embodiment of the present disclosure.

FIG. 21A is a schematic structural diagram of a module of a terminal or UE according to an embodiment of the present disclosure. As shown in FIG. 21A, an IoT terminal 2100 includes at least an IoT application module 2111 and a communications module 2110. The IoT application module 2111 exchanges data of the IoT application with an external device using the communications module 2110, for example, reporting data to the IoT application server or sending data to another IoT terminal. The IoT application module 2111 should have a capability of reporting IoT application data by the terminal using the radio resource allocated by the radio transceiver node to the terminal based on the coordinated radio resource scheduling indication and other coordinated radio resource scheduling information as described in the foregoing embodiment.

Figure 21B:
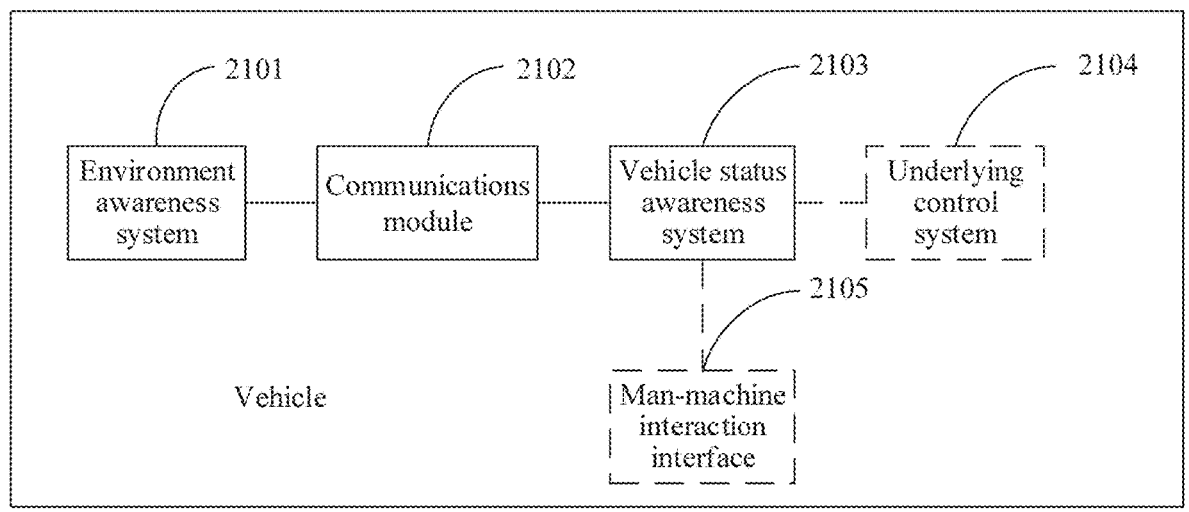
FIG. 21B is a schematic diagram of a functional module of a vehicle according to an embodiment of the present disclosure.

A V2X application is used as an example. FIG. 21B is a schematic structural diagram of composition of a terminal, that is, a vehicle, in the V2X application. As shown in FIG. 21B, the vehicle includes at least a vehicle status awareness system 2103, an environment awareness system 2101, and a communications module 2102. The communications module 2102 in FIG. 21B is a specific embodiment of the communications module 2110 in FIG. 21A. The environment awareness system 2101 and the vehicle status awareness system 2103 in FIG. 21B are a specific embodiment of the IoT application module 2111 in FIG. 21A.

The environment awareness system 2101 is configured to collect environment information related to a vehicle, and report data to the V2X AS using the communications module 2102. The environment awareness system 2101 may include a camera, a laser radar, a millimeter wave radar, a global positioning system (GPS), and the like.

The vehicle status awareness system 2103 may obtain data such as a vehicle position, a speed, an accelerated speed, and steering using a T-Box, an OBD, and an in-vehicle sensor. In addition, the vehicle status awareness system 2103 may further obtain one or more pieces of information in a vehicle driver's breathing state, an eye opening state, and a concentration state by deploying a camera inside the vehicle, and sends the data to the V2X AS using the communications module 2102. The vehicle status awareness system 2103 may be executed on a V2X standard terminal (T-Box). An in-vehicle T-Box may read CAN bus data of a vehicle deeply, output a vehicle status report, a driving report, fuel consumption statistics, a fault alarm, a violation query, a location track, a driving behavior, a security anti-theft, a reservation service, a remote vehicle search, controlling a vehicle door, a window, a lamp, a lock, a horn, a double flash, a backlight folding, a sunroof, and monitoring a central control warning, and a security airbag status using a mobile phone, and transmit the data to the V2X AS using the communications module 2102.

The vehicle may further include an underlying control system 2104, including a braking and driving system, an electric power steering system, an automatic transmission system, an electronic stability system, and the like. Optionally, the vehicle further includes a man-machine interaction interface 2105. For example, in an auxiliary driving scenario, in an emergency case, the vehicle status awareness system 2103 displays, on the man-machine interaction interface, alarm information obtained by the communications module 2102, for driver reference. It may be understood that, in an automatic driving scenario, the vehicle status awareness system 2103 directly sends the received alarm information, such as front vehicle emergency brake information, to the underlying control system 2104 such that the underlying control system 2104 adjusts a vehicle speed.

The structure of the device shown in FIG. 21B imposes no limitation on the vehicle. The vehicle may include components more or fewer than those shown in the figure, combine some components, or have different component arrangements. Details are not further described herein.

Figure 22:
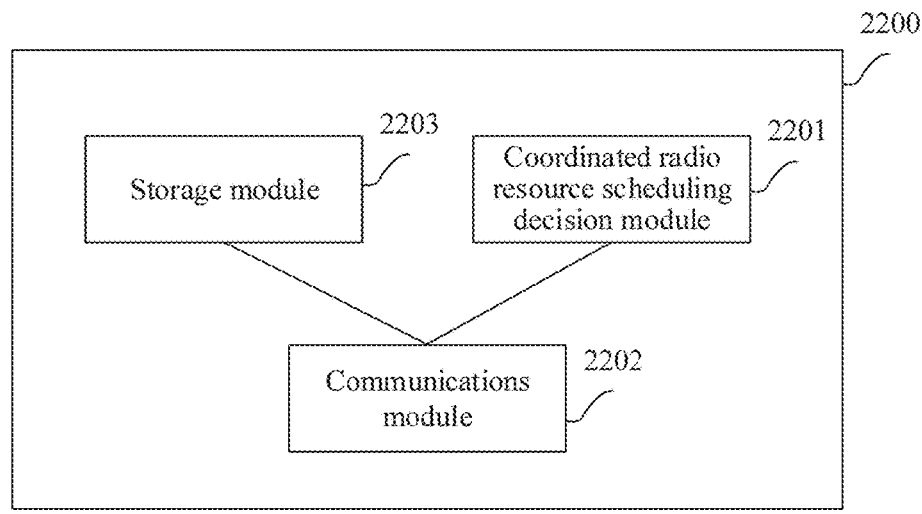
FIG. 22 is a schematic diagram of a coordinated radio resource scheduling decision functional module according to an embodiment of the present disclosure.

FIG. 22 is a schematic diagram of a possible functional module of a coordinated radio resource scheduling decision function according to an embodiment of the present disclosure. A communications module 2202 is configured to communicate with another network element or logical function in a communications network, for example, communicating with a bearer control function, a radio transceiver node, or a UDM function (such as an HSS or a UDM). The storage module 2203 is configured to store subscription data of a user. The coordinated radio resource scheduling decision module 2201 is configured to, when receiving an activated coordinated radio resource scheduling indication sent by the bearer control function, determine, based on the subscription data of the user, whether to activate coordinated radio resource scheduling, generate a message for activating the coordinated radio resource scheduling, and send the message to the radio transceiver node using the communications module 2202.

Figure 23:
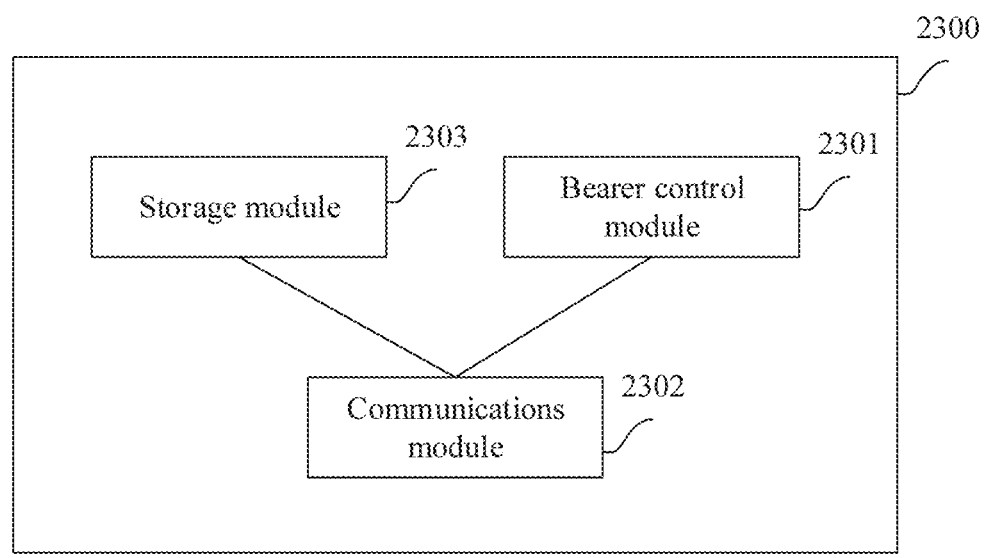
FIG. 23 is a schematic diagram of a bearer control functional module according to an embodiment of the present disclosure.

FIG. 23 is a schematic diagram of a possible functional module of a bearer control function according to an embodiment of the present disclosure. The communications module 2302 is configured to communicate with another network element or logical function in a communications network and a V2X AS, for example, a coordinated radio resource scheduling decision function. The storage module 2203 is configured to store information related to a bearer between UE and the V2X AS, such as service flow information and a bearer identifier. A bearer identifier obtaining module 2201 is configured to, when receiving an activation or deactivation coordinated radio resource scheduling indication sent by the V2X AS or a VCF, obtain a bearer identifier that matches the V2X service flow information, generate a message for activating coordinated radio resource scheduling, and send the message to the coordinated radio resource scheduling decision function using the communications module 2202.

The integrated module may be implemented in a form of hardware, or may be implemented in a form of a software functional module. For example, the data analysis module 1901 in FIG. 19 may be implemented by invoking code in the memory 1803 by the processor 1801 in FIG. 18. This is not limited in this embodiment of the present disclosure.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

The objectives, technical solutions, and benefits of the present disclosure are further described in detail in the foregoing specific embodiments. The person of skill in the art should be understood that the foregoing descriptions are merely specific embodiments of the present disclosure, but are not intended to limit the protection scope of the present disclosure. Any modification, equivalent replacement, or improvement made within the spirit and principle of the present disclosure shall fall within the protection scope of the present disclosure. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

What is claimed is:

1. An Internet of things communication resource scheduling method implemented by an Internet of things application server, the Internet of things communication resource scheduling method comprising:
   determining to start coordinated radio resource scheduling on a terminal;
   sending a coordinated radio resource scheduling activation request to a radio transceiver node, wherein the coordinated radio resource scheduling activation request comprises an identifier of the terminal, and wherein the coordinated radio resource scheduling activation request instructs the radio transceiver node to start the coordinated radio resource scheduling on the terminal;
   determining to stop the coordinated radio resource scheduling on the terminal; and
   sending a coordinated radio resource scheduling deactivation request to the radio transceiver node, wherein the coordinated radio resource scheduling deactivation request comprises the identifier of the terminal, and wherein the coordinated radio resource scheduling deactivation request instructs the radio transceiver node to stop the coordinated radio resource scheduling on the terminal.

2. The Internet of things communication resource scheduling method of claim 1, further comprising:
analyzing data from the terminal to detect a driving condition; and
determining to start the coordinated radio resource scheduling on the terminal based on detecting the driving condition.

3. The Internet of things communication resource scheduling method of claim 2, wherein the coordinated radio resource scheduling activation request or the coordinated radio resource scheduling deactivation request is sent to the radio transceiver node using a bearer control function, wherein the coordinated radio resource scheduling activation request from the Internet of things application server further comprises information about an Internet of things service flow, and wherein the Internet of things service flow is a service flow between the terminal and the Internet of things application server.

4. The Internet of things communication resource scheduling method of claim 3, wherein the bearer control function is implemented by any one or more of a policy and charging rules function, a policy control function, a packet data gateway, or a session management function.

5. The Internet of things communication resource scheduling method of claim 2, wherein the coordinated radio resource scheduling activation request or the coordinated radio resource scheduling deactivation request is sent to the radio transceiver node using an Internet of things control function.

6. The Internet of things communication resource scheduling method of claim 1, wherein the coordinated radio resource scheduling activation request further comprises one or more of an Internet of things service identifier, a coordinated radio resource scheduling latency requirement, a coordinated radio resource scheduling uplink packet size, a coordinated radio resource scheduling uplink packet period, or a coordinated radio resources schedule uplink packet moment, and wherein the Internet of things service identifier is an identifier of an Internet of things service provided by the Internet of things application server.

7. The Internet of things communication resource scheduling method of claim 1, wherein determining to start the coordinated radio resource scheduling on the terminal comprises determining, at least based on data reported by the terminal, to start the coordinated radio resource scheduling on the terminal.

8. An Internet of things communication resource scheduling method implemented by a radio transceiver node, the Internet of things communications resource scheduling method comprising: receiving a coordinated radio resource scheduling activation request, wherein the coordinated radio resource scheduling activation request comprises an identifier of a terminal; determining to allow coordinated radio resource scheduling for the terminal based on subscription data of the terminal; actively granting a radio resource to the terminal according to the coordinated radio resource scheduling activation request and responsive to determining to allow the coordinated radio resource scheduling; receiving a coordinated radio resource scheduling deactivation request, wherein the coordinated radio resource scheduling deactivation request comprises the identifier of the terminal; and stopping actively granting the radio resource to the terminal.

9. The Internet of things communication resource scheduling method of claim 8, wherein receiving the coordinated radio resource scheduling activation request or the coordinated radio resource scheduling deactivation request comprises receiving the coordinated radio resource scheduling activation request or the coordinated radio resource scheduling deactivation request from a packet data gateway.

10. The Internet of things communication resource scheduling method of claim 8, wherein receiving the coordinated radio resource scheduling activation request or the coordinated radio resource scheduling deactivation request comprises receiving the coordinated radio resource scheduling activation request or the coordinated radio resource scheduling deactivation request from a coordinated radio resource scheduling decision function, and wherein the coordinated radio resource scheduling decision function is implemented by a mobility management entity.

11. The Internet of things communication resource scheduling method of claim 8, wherein receiving the coordinated radio resource scheduling activation request or the coordinated radio resource scheduling deactivation request comprises receiving the coordinated radio resource scheduling activation request or the coordinated radio resource scheduling deactivation request from a coordinated radio resource scheduling decision function, and wherein the coordinated radio resource scheduling decision function is implemented by an access and mobility function.

12. The Internet of things communication resource scheduling method of claim 8, wherein the coordinated radio resource scheduling activation request or the coordinated radio resource scheduling deactivation request further comprises one or more of an Internet of things service identifier, a coordinated radio resource scheduling latency requirement, a coordinated radio resource scheduling uplink packet size, a coordinated radio resource scheduling uplink packet period, or a coordinated radio resource scheduling uplink packet moment.

13. The Internet of things communication resource scheduling method of claim 8, wherein after receiving the coordinated radio resource scheduling activation request or the coordinated radio resource scheduling deactivation request, the Internet of things communication resource scheduling method further comprises forwarding the coordinated radio resource scheduling activation request or the coordinated radio resource scheduling deactivation request to the terminal.

* * * * *